United States Statutory Invention Registration [19]

[11] Reg. Number: H674

Nagasaki et al. [43] Published: Sep. 5, 1989

[54] SILVER HALIDE PHOTOGRAPHIC LIGHT-SENSITIVE MATERIAL CAPABLE OF SUPER-RAPID PROCESSING

[75] Inventors: Satoru Nagasaki, Hino; Akio Suzuki; Eiji Yoshida, both of Hachioji; Masumi Arai; Nobuaki Tsuji, both of Hino, all of Japan

[73] Assignee: Konica Corporation, Hino, Japan

[21] Appl. No.: 116,229

[22] Filed: Nov. 3, 1987

[30] Foreign Application Priority Data

Nov. 4, 1986 [JP] Japan ..... 61-262295
Dec. 15, 1986 [JP] Japan ..... 61-298499

[51] Int. Cl.[4] ..... G03C 1/00

[52] U.S. Cl. ..... 430/496; 430/963; 430/966; 430/576; 430/583; 430/588

[58] Field of Search ..... 430/496, 963, 966, 967, 430/950, 583, 576, 591, 588

[56] References Cited

U.S. PATENT DOCUMENTS

| | | | |
|---|---|---|---|
| 3,545,971 | 12/1970 | Barnes et al. | 430/355 |
| 3,754,924 | 8/1973 | De Geest et al. | 430/950 |
| 3,843,368 | 10/1974 | Yamamoto et al. | 430/529 |
| 4,030,924 | 6/1977 | Hofman | 430/963 |
| 4,272,616 | 6/1981 | Kishimoto | 430/637 |
| 4,292,402 | 9/1981 | Pollet et al. | 430/950 |
| 4,409,322 | 10/1983 | Ezaki et al. | 430/950 |
| 4,426,445 | 1/1984 | Minamizono et al. | 430/600 |
| 4,659,654 | 4/1987 | Metoki et al. | 430/966 |
| 4,675,278 | 6/1987 | Sugimoto et al. | 430/950 |

FOREIGN PATENT DOCUMENTS

| | | | |
|---|---|---|---|
| 51-47045 | 8/1976 | Japan . | |
| 215941 | 9/1987 | Japan | 430/966 |
| 229131 | 10/1987 | Japan | 430/966 |

*Primary Examiner*—Teddy S. Gron
*Assistant Examiner*—Richard Treanor
*Attorney, Agent, or Firm*—Finnegan, Henderson, Farabow, Garrett & Dunner

[57] ABSTRACT

A silver halide photographic light-sensitive material comprising a support having the first photographic structural layer comprising one or more layers on a side of the support and the second photographic structural layer comprising one or more layers on the other side of the support, in which at least one of the photographic structural layers comprises a silver halide light-sensitive emulsion layer, and the total amount of gelatin contained in the photographic structural layer comprising the silver halide emulsion layer is within the range of from 2.25 g/m$^2$ to 3.15 g/m$^2$. The uppermost layer of the photographic structural layer comprising the silver halide emulsion is formed by coating of a solution having a surface tension of from 15 to 26 dyn/cm, and the second photographic structural layer is coated and gelled simultaneously with coating and drying of the first photographic structural layer. The photographic material is improved in the adaptability for super-rapid processing with the total duration of 20 to 60 sec. and the anti-scratch property.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL CAPABLE OF SUPER-RAPID PROCESSING

FIELD OF THE INVENTION

The present invention relates to a silver halide photographic light-sensitive material, in particular, a silver halide photographic light-sensitive material which does not incur disadvantages in the coating process, and allows super-rapid photographic processing.

BACKGROUND OF THE INVENTION

Recently, increasingly more silver halide photographic light-sensitive materials are used, which has resulted in the quantity of silver halide photographic light-sensitive material to be developed. This trend correspondingly requires more rapid developing process, in other words, an enhanced processing capacity per specific duration.

This trend is also witnessed in the field of X-ray photographic light-sensitive material, in particular, X-ray films for medical diagnosis. More specifically, increasing diagnostic procedures due to increasingly frequent regular medical examinations, as well as increased checkup items to ensure more accurate diagnosis are contributing to the increase in the X-ray photographs being processed.

At the same time, the diagnostic result should be notified to a case as soon as possible.

To summarize this, there are mounting demands for unconventionally rapid developing process to expedite the medical diagnosis. Additionally, there are need for the swift provision of photographs, for example, in the vasography or X-ray photography during a medical operation.

To fulfill the above requirements in medical field, it is necessary not only to automate diagnostic procedures (photographing, transporting and the like) but to process X-ray films more rapidly.

The super-rapid processing, however, often incurs disadvantages, such as (a) insufficient density or deterioration in sensitivity, contrast, and maximum density, (b) in sufficient fixing, (c) insufficient water rinsing of films, and (d) insufficient drying of films. The insufficient fixing or water rinsing can result in discoloration as a film is stored, and hence the deteriorated image quality.

One countermeasure to solve these problems is to reduce the amount of gelatin involved in the photographic material. The reduced amount of gelatin, however, readily causes disadvantages uneven coating, brush marks during coating process of silver halide photographic light-sensitive materials. Additionally, photographic films involving less gelatin more easily cause the so-called scratch-induced blackening, which is a phenomenon where an area subjected to scratching with another film or foreign material will show a higher density than other areas once the films are developed.

As mentioned previously, there are mounting needs for the super-rapid photographic processing, and, however, with various problems to be solved. Incidentally, according to this specification, the term "super-rapid processing" means the photographic processing whose total duration is within a range of 20 to 60 seconds; within this duration, the leading edge of film is introduced into an automatic developing unit, and transferred via a dveloping bath, interface portion, fixing bath, interface portion, water-rinsing bath, interface portion, then a drying portion, and the same edge is eventually ejected from the drying portion, wherein the duration equals a quotient in sec. obtained by dividing a line transportation rate in m/sec. by a total length of processing line in m. The reason for why the periods associated with the interface portions should be included is well known in the photographic art; even in the interface portions, a gelatin layer in the photographic material contains a processing solution employed in a preceeding process and, accordingly, the photographic treatment substantially proceeds.

In Japanese Patent Publication No. 47045/1976, there is disclosed the significance of amount of gelatin in relation to the rapid processing, wherein the total processing duration including the interface areas is 60 to 120 seconds. However, such a long duration fails to comply with the recent needs for super-rapid processing.

The current X-ray photography requires a high-precision photographic technique involving smaller exposure dose. This need in turn necessitates the development of a photographic material being capable of providing a high-precision image with a smaller X-ray dosage, in other words, a more sensitive photographic material.

There are diverse sensitizing methods available to enhence the sensitivity of silver halide with a specific average particle size. The reported methods are as follows a method to add a developing accelerator such as thioether to an emulsion; a method to supersensitize a spectrally sensitized silver halide emulsion, by using a relevant combination of dyes; a method for improving a chemical sensitizer. These methods, however, not always fulfill the requirements for a highly sensitive silver halide photographic light-sensitive material. In other words, when any of the above methods is used to allow maximum chemical sensitization, the highly sensitive silver halide photographic light-sensitive material tends to cause fogging in the course of storage.

In the field of medical X-ray photography, conventional regular type light-sensitive materials having sensitive wave range of 450 nm are increasingly replaced with ortho type light-sensitive materials whose sensitive range having been changed by ortho sensitization to a region of 540 to 550 nm. The ortho-sensitized materials have a wider range of sensitive wavelength as well as enhanced sensitivity. Accordingly, such materials reduce the X-ray dosage as well as unfavorable effects on human body. In this context, the dye sensitization is a useful sensitization means. However, the similar means still has unsolved problems; for example, a sufficient sensitivity is not achieved with a specific type of photographic emulsions to be used.

SUMMARY OF THE INVENTION

Therefore, the first object of the invention is to solve the above mentioned problems prior art incurs when the super-rapid processing with the total processing duration of 20 to 60 seconds is performed, in order to provide a silver halide photographic light-sensitive material which excels in the sensitivity, contrast, maximum density, fixing properties, drying properties and other properties.

The second object of the invention is to provide a silver halide photographic light-sensitive material having a limited amount of gelatin and seldom incurring failures even in applying a coating solution which has a smaller surface tension.

The third object of the invention is to provide a silver halide photographic light-sensitive material less possibly incurring scratch-induced blackening even if a smaller amount of gelatin is used.

The above objects are attained by a silver halide photographic light-sensitive material comprising a support having the first photographic structural layer comprising one or more layers on a side of the support and the second photographic structural layer comprising one or more layers on the other side of the support, wherein at least one of the photographic structural layers comprises a silver halide light-sensitive emulsion layer, the total amount of gelatin contained in the photographic structural layer comprising the silver halide emulsion layer is within the range of from 2.25 $g/m^2$ to 3.15 $g/m^2$, the uppermost layer of the photographic structural layer comprising the silver halide emulsion layer is formed by coating of a solution having a surface tension of from 15 to 26 dyn/cm, and the second photographic structural layer is coated and gelled simultaneously with coating and drying of the first photographic structural layer.

The silver halide photographic light-sensitive material the invention contains a matting agent of which mattnesss is preferably 40 to 150 mmHg.

Additionally, the silver halide photographic light-sensitive material should be preferably processed with an automatic developing unit whose total processing time is 20 to 60 seconds.

DETAILED DESCRIPTION OF THE INVENTION

Figure 1:
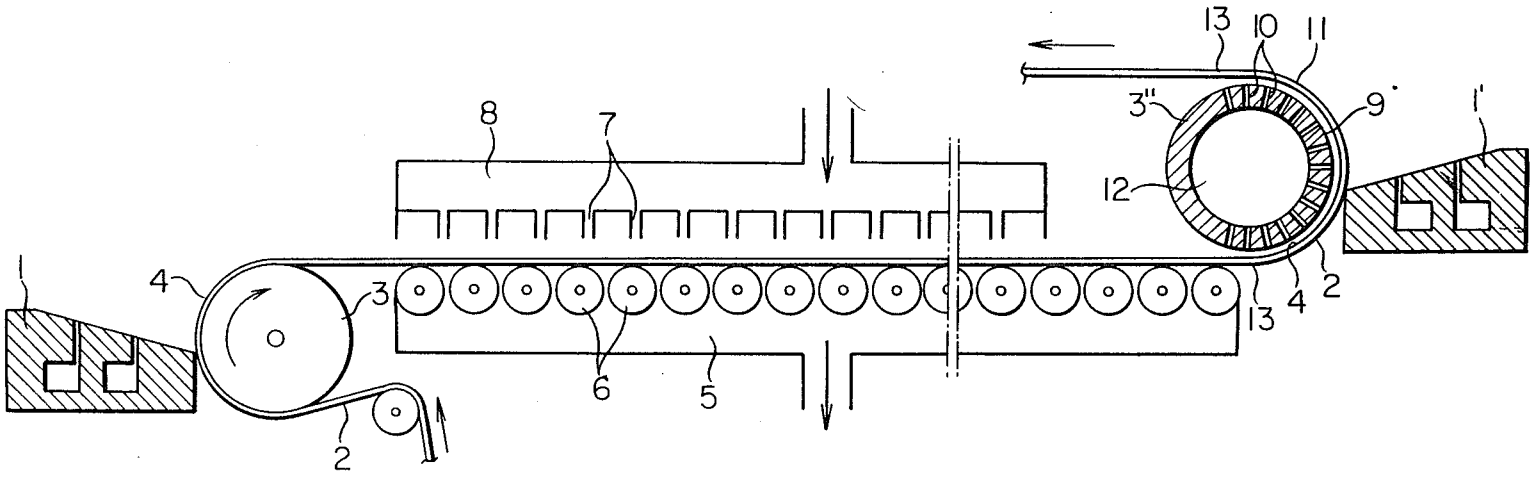
FIG. 1 is a cross sectional drawing illustrating a coating apparatus useful in embodying the invention, wherein the two-layer coating method using a slide hopper is used to continuously applying coating solutions on both surfaces of a support.

According to the present invention, usually, the term "outermost layer" literally means the upper outermost layer. However, such an outermost layer may be further coated with coating such as super cost which is applied, for example, by means of spray. Additionally, the "outermost layer" of the invention may be either a light-sensitive layer or a non-light-sensitive layer.

In the present invention, there is disposed, on at least one surface of a support, at least one silver halide emulsion layer. The support may have, on the other surface, either a light-sensitive silver halide layer or non-light-sensitive layer. If more than two silver halide emulsion layers on one surface of the support are formed, a non-light-sensitive layer may be provided between any of these emulsion layers. However, at least, the support should have on its both surfaces a light-sensitive silver halide emulsion layer and on the other surface a non-light-sensitive layer.

According to the invention, the term "amount of gelatin" means the total amount of gelatin present in the light-sensitive and non-light-sensitive layers both on the light-sensitive layer surface of a support. If the support have a light-sensitive layer on both surfaces, the term "amount of gelatin" means the total amount of gelatin present on one specific surface.

According to the invention, the term "light-sensitive layer" means a layer sensitive to light, for example, a light-sensitive silver halide emulsion layer.

According to the invention, the terms "non-light-sensitive layer" means a layer not sensitive to light, for example, a subbing layer, intermediate layer, protective layer, antihalation layer, filter layer or the like.

As one preferred example embodying the invention, a preferred silver halide photographic light-sensitive material has in the silver halide emulsion layer the silver halide particles whose average particle diameter is 0.30 to 1.50 μm, more specifically, 0.40 to 1.30 μm, and most specifically, 0.40 to 1.10 μm.

As another preferred example embodying the invention, a preferred silver halide photographic light-sensitive material has multi-layered silver halide particles which are substantially made of silver iodo-bromide, wherein the difference in average iodine contents between two arbitrary, independently uniform, adjacent layers, between two coating layers, or between the internal core and a coating layer, is more than 10 mol %, and the average iodine content in the outermost layer is less than 10 mol %, and the material has been chemically sensitized.

Such multi-layered silver halide particles individually comprise an internal core coated with a layer of an arbitrary halide composition. The layer may comprise one layer, or more than two layers, for example, the lamination of three or four layers. However, the preferred number of layers is less than five.

Silver halides useful as internal core and coating layers are silver bromide, silver iodo-bromide and silver iodide. However, any of such silver halides may involve a limited amount of silver chloride. To be more concrete, the silver halide may contain less than 10 mol %, more favorably, less than 5 mol % of silver chloride.

Additionally, the outermost layer of each silver halide particle should be substantially made of silver bromide, or silver iodo-bromide containing less than 10% of iodide, and may contain less than several % of chlorine atoms.

The preferred average iodide content in whole silver halide particles of the invention is less than 10 mol %, or, more specifically, less than 6 mol %.

For example, in an X-ray photographic light-sensitive material, the iodide content sometimes worsens the problems such as development inhibition, infectious development and the like. Accordingly, in practice, the iodide content should be preferably limited below a specific level. In any cases, the method according to the invention decreases the stress fogging. However, because of the above reason, the preferred total iodide content in whole silver halide particles is less than 10 mol %, or, more specifically, less than 7 mol %, or, most specifically, less than 5 mol %.

If the internal core comprises silver iodo-bromide, the core should preferably be made of a uniform solid solution.

The concept "to be uniform" can be defined as follows.

"To be uniform" means the peak width at half height expressed by Miller index [200] of silver iodo-bromide obtainable from the use of Cu-K$\beta$X-ray is smaller than $2\theta = 0.30$ (deg), in the course of X-ray diffraction analysis of silver halide particles. In this analysis, the condition of using a diffractometer is $\omega r/r \leqq 10$, where the scanning rate of goniometer is $\omega$(deg/min), time constant is r(sec), and receiving slit width if r(mm).

In regard to the halide composition of internal core, the preferred average iodine content is less than 40 mol %, in particular, 0 to 20 mol %.

The preferred difference in average iodide contents between two adjacent layers (between arbitrary two coating layers, or between the internal core and a coating layer) is more than 10 mol %, and more specifically, more than 20 mol %, and most specifically, more than 25 mol %.

The preferred silver iodide content in the coating layers other than the outermost coating layer is 10 to 100 mol %.

If an individual silver halide particle comprises more than three layers, and at the same time, if the coating layers are made of silver iodo-bromide, all the layers are preferably made of uniform silver iodo-bromide, though it is compulsory that these layers are made of uniform silver iodo-bromide.

Such a coating layer or an internal core having high iodide content should be preferably present below the outermost layer, in the case of negative-type silver halide emulsion. In the case of positive-type silver halide emulsion, the similar coating layer may be present either on or within the surface of individual silver halide particle.

The preferred silver iodide content in the outermost coating layer of the silver halide particle is less than 10 mol %, in particular, 0 to 5 mol %.

The iodide contents in the internal core and coating layers of individual silver halide particles which are used in embodying the invention may be determined by a method, for example, disclosed in "X-ray analysis with TEM/ATEM" Scanning Electron Microscopy (1977), by J. I. Goldstein and D. B. Williams, vol. I. IIT Research Institute, p. 651 (May, 1977).

If the silver halide particles used in embodying the invention are, for example, two-layered, it is advantageous that the internal core has the higher iodide content than the outer layer. In the case of three-layered similar particles, a coating layer other than the outermost layer, or the internal core, should preferably have the higher iodide content than the outermost layer.

The present invention is advantageously applied to the chemically sensitized silver halide particles. This is because non-sensitized particles have extremely low sensitivity, and, naturally, seldom incurs scratch-induced fogging and pressure desensitization.

The silver halide particles used in embodying the invention are whichever positive-type or negative-type.

If the similar particles are negative type, the preferred criterion of chemical sensitization is as follows; sensitivity corresponding to a point "fogging +0.1" in the optical density curve is more than 60% of optimum sensitization degree.

If the similar particles are positive type, the preferred criterion of chemical sensitization for the interior of individual particles is as follows; sensitivity corresponding to a point "fogging −0.1" in the optical density curve is more than 60% of optimum sensitization degree.

The average particle size of silver halide particles used in the invention is expressed as the average length of edges on imaginary cubes whose volumes are equal to corresponding particles.

According to the invention, the outermost layer of light-sensitive material is formed with a coating solution having a surface tension of less than 26 dyn/cm. To ensure that the surface tension of a coating solution to form the outermost layer, usually the uppermost layer, is less than 26 dyn/cm, an arrangement to incorporate at least one surfactant into the uppermost layer is available. In this arrangement, a layer immediately below the uppermost layer may or may not contain a surfactant. Surfactants used respectively in the uppermost layer and the layer immediately below are either identical or different.

It is satisfactory if the surface tension for a coating solution to form the uppermost layer is less than 26 dyn/cm. The smaller the tension is, the better the result will be. However, in view of practical coating technique, it is advantageous to set the lower limit at 15 dyn/cm.

The examples of such a surfactant useful in embodying the invention are as follows: nonionic surfactants such as saponin, alkylene oxide derivative, aliphatic esters of multivalent alcohols, alkyl esters of sugars, and others; anionic surfactants having an acid group such as carboxy group, sulfo group, phospho group, sulfuric ester group, phosphoric ester group, or the like; ampholytic surfactants such as amino acids, aminoalkyl sulfonic acids, aminoalkyl sulfuric esters, aminoalkyl phosphoric esters, alkylbetaines, amine oxides and the like. Other useful surfactants are as follows: cationic surfactants including alkyl amine salts, aliphatic or aromatic quaternary ammonium salts, and heterocyclic quaternary ammonium salts of pyridinium or the like, and aliphatic or heterocyclic phosphonium salts, and aliphatic or heterocyclic sulfonium salts; fluorine-containing surfactants such as those containing polyoxyethylene group.

The examples of alkylene oxide surfactant are disclosed, for example, in Japanese Patent Publication No. 9610/1976, DT-2648746, Japanese Patents Open to Public Inspection (hereinafter referred to as Japanese Patent O.P.I. Publications) Nos. 129623/1978, 89624/1979, 98235/1979, 208743/1983, 80848/1985 and 94126/1985.

The examples of fluorine-containing surfactant include compounds disclosed in Japanese Patent Publications Nos. 9303/1972, 43130/1973, 25087/1977 and 1230/1982, Japanese Patent O.P.I. Publications Nos. 46733/1974, 16525/1975, 34233/1975, 32322/1976, 14224/1979, 111330/1979, 557762/1980, 19042/1981, 41093/1981 34856/1981, 11341/1982, 29691/1982, 64228/1982, 146248/1982, 14944/1981, 11945/1981, 196544/1983, 200235/1983, 109548/1975 and 136534/1982, U.S. Pat. Nos. 3,589,906, 3,775.126 and 4,292,402, RD-16630 and others, as well as compounds disclosed in Japanese Patent O.P.I. Publication No. 164738/1985.

The preferred anionic surfactants not having a polyalkylene oxide are typified by the following 1 - 1 through 1 - 10.

$C_4H_9O—SO_3Na$ 1-1

1-2

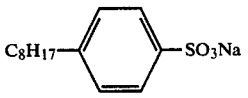

-continued
1-3
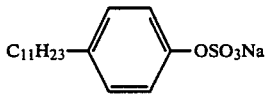
1-4
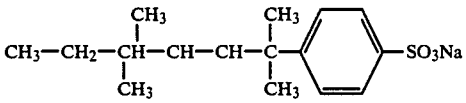
1-5
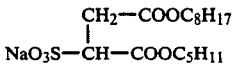
1-6
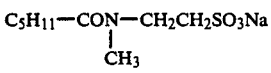
-continued
1-7
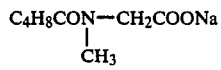
1-8
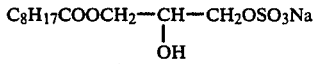
1-9
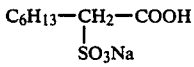
1-10
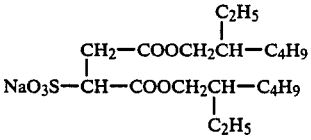
The preferred flourine containing surfactants are typified by the following 2 - 1 through 2 - 82.
$C_3F_5O(CH_2CH_2O)_{20}C_{12}H_{25}$ 2-1
$C_3F_5O(CH_2CH_2O)_5C_3F_5$ 2-2
$C_6F_{13}O(CH_2CH_2O)_{10}C_4H_9$ 2-3
$C_6F_{13}O(CH_2CH_2O)_{20}C_6H_{13}$ 2-4
$C_6F_{13}O(CH_2CH_2O)_7CH_3$ 2-5
$C_9F_{17}O(CH_2CH_2O)_{20}CH_3$ 2-6
2-7
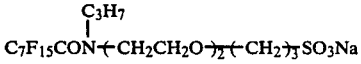
2-8
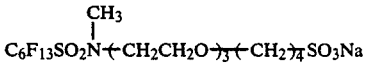
2-9
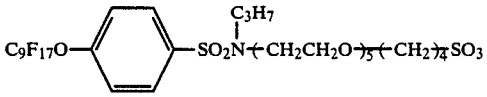
2-10
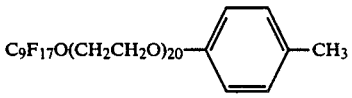
2-11
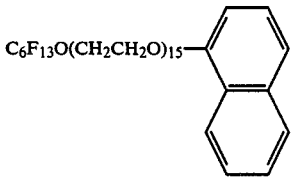
2-12
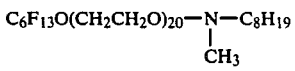
2-13
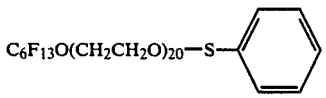
$C_6F_{13}O(CH_2CH_2O)_{40}-C_{18}H_{35}$ 2-14
$C_9F_{17}O(CH_2CH_2O)_{10}-H$ 2-15
$C_{12}F_{23}O(CH_2CH_2O)_{50}-CH_3$ 2-16

-continued $C_6F_{11}O(CH_2CH_2O)_{20}(\underset{\underset{CH_3}{|}}{C}HCH_2O)_3CH_3$ 2-17

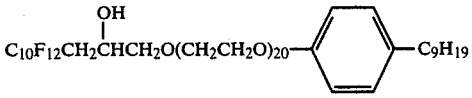
2-18

$C_9F_{19}CH_2\overset{\overset{OH}{|}}{C}HCH_2O(C_2H_4O)_{10}CH_3$ 2-19

$C_6F_{13}SO_2\overset{\overset{C_3H_7}{|}}{N}(CH_2CH_2O)_2\overset{\overset{O}{\|}}{C}-CH$ 2-20

$C_6F_{13}SO_2\overset{\overset{C_3H_7}{|}}{N}(CH_2CH_2O)_2\overset{\overset{O}{\|}}{C}-CH_2-SO_3Na$ $C_8F_{17}(CH_2CH_2O)_5(CH_2)_4SO_3Na$ 2-21

$H(CF_2)_8CH_2O(CH_2CH_2)_4(CH_2)_3SO_3H$ 2-22

$C_7F_{15}COO(CH_2CH_2O)_4(CH_2)_4SO_3K$ 2-23

$C_8F_{17}SO_2\overset{\overset{CH_3}{|}}{N}(CH_2CH_2O)_8SO_3Na$ 2-24

$C_4F_9(CH_2CH_2O)_3SO_3Na$ 2-25

$C_8F_{17}SO_2\overset{\overset{C_3H_7}{|}}{N}(CH_2CH_2O)_6CH_2COONa$ 2-26

$H(CF_2)_8CH_2O(CH_2CH_2O)_3\overset{\overset{O}{\|}}{\underset{\underset{ONH_4}{|}}{P}}-ONH_4$ 2-27

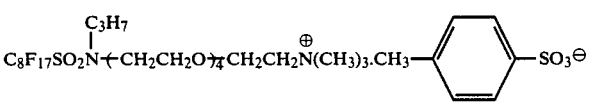
2-28

$C_8F_{17}SO_2\overset{\overset{C_3H_7}{|}}{N}(CH_2CH_2O)_4CH_2CH_2\overset{\oplus}{N}(CH_3)_3.CH_3-SO_3^{\ominus}$ $C_8F_{17}SO_2\overset{\overset{C_3H_7}{|}}{N}(CH_2CH_2O)_4CH_2CH_2-\overset{\oplus}{\underset{\underset{CH_3}{|}}{\overset{\overset{CH_3}{|}}{N}}}-CH_2COO^{\ominus}$ 2-29

$C_8F_{17}(CH_2CH_2O)_3CH_2CH_2-\overset{\oplus}{\underset{\underset{CH_3}{|}}{\overset{\overset{CH_3}{|}}{N}}}-CH_2COO^{\ominus}$ 2-30

$C_8F_{17}SO_2\overset{\overset{C_3H_7}{|}}{N}(CH_2CH_2O)_8H$ 2-31

$C_6F_{13}SO_3Na$ 2-32

$C_8F_{17}SO_3Na$ 2-33

$C_6F_{13}COOK$ 2-34

$C_8F_{17}SO_3COOK$ 2-35

$C_8F_{17}SO_2\underset{\underset{C_3H_7}{|}}{N}CH_2COOK$ 2-36

$F_3C-(CF_2)_2-COOH$ 2-37

$H-(CF_2)_6-COOH$ 2-38

-continued
$CF_3-(CF_2)_6-COONH_4$ 2-39
$H-(CF_2)_{10}-COOH$ 2-40
$H-(CF_2)_6-CH_2-OSO_3Na$ 2-41
$H-(CF_2)_3-CH_2-OSO_3Na$ 2-42
2-43
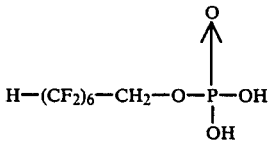
2-44
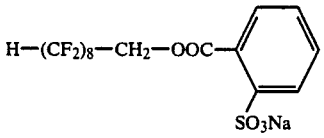
2-45
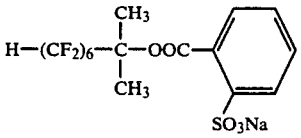
2-46
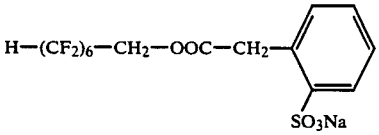
2-47
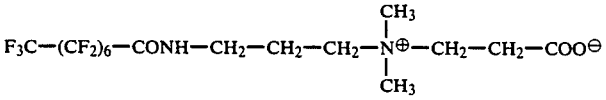
$H-(CF_2)_6-CONH-CH_2-O-SO_3Na$ 2-48
2-49
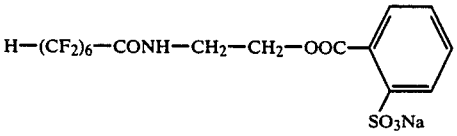
2-50
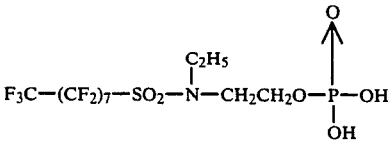
2-51
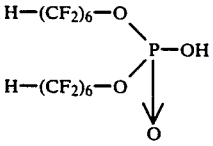
2-52
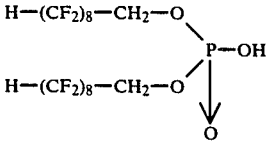

-continued
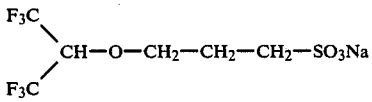
2-53
$H-(CF_2)_6-CH_2-O-CH_2-CH_2-CH_2-SO_3Na$ 2-54
$F_3C-(CF_2)_6-CH_2-O-CH_2-CH_2-CH_2-SO_3Na$ 2-55
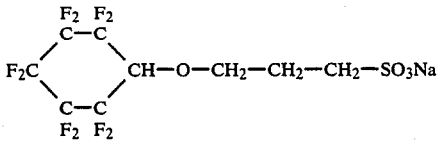
2-56
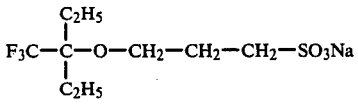
2-57
$F_3C-(CF_2)_2-COO-CH_2-CH_2-CH_2-SO_3Na$ 2-58
$H-(CF_2)_{10}-COO-CH_2-CH_2-CH_2-SO_3Na$ 2-59
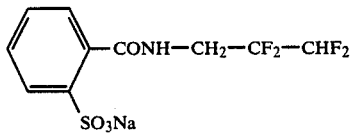
2-60
$F_3C-(CF_2)_2-COO(-CH_2CH_2O)_7-CH_3$ 2-61
$F_3C-(CF_2)_7-SO_2-N(-CH_2CH_2O)_4H$ (with $C_2H_5$ on N) 2-62
$F_3C-(CF_2)_2-CH_2O(-CH_2CH_2O)_5H$ 2-63
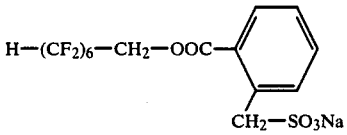
2-64
$C_{16}H_{33}-CH(SO_3Na)-COO-CH_2-CF_3$ 2-65
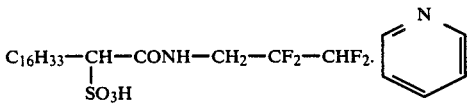
2-66
$F_3C-(CF_2)_7-SO_2-N(C_2H_5)-CH_2COOH$ 2-67
$F_3C-(CF_2)_7-SO_2-N(C_2H_5)-CH_2-CH_2-O-SO_3H$ 2-68
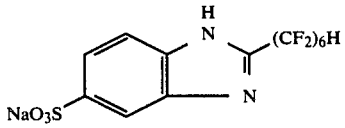
2-69
$NaO_3S-CH(CH_2-COOCH_2(CF_2CF_2)_3H)-COOCH_2(CF_2CF_2)_3H$ 2-70

-continued 2-71

$$C_8F_{17}SO_2N(C_2H_5)CH_2CH_2OP(=O)(OH)_2$$

2-72

$$F_{17}C_8SO_2NHCH_2CH_2CH_2-\overset{\oplus}{N}(CH_3)_2-CH_2CH_2OHBr^{\ominus}$$

2-73

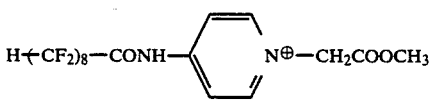

2-74

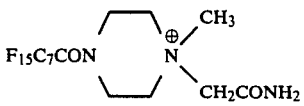

2-75

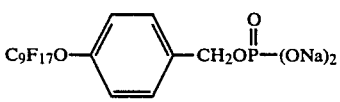

2-76

$$C_8F_{17}SO_2N(C_3H_7)CH_2CH_2OP(=O)(ONH_4)_2$$

2-77

$$C_7F_{15}CON(CH_3)-CH_2CH_2CH_2OCH_2CH_2\overset{\oplus}{N}(CH_3)_3\ I^{\ominus}$$

2-78

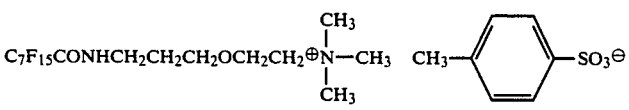

2-79

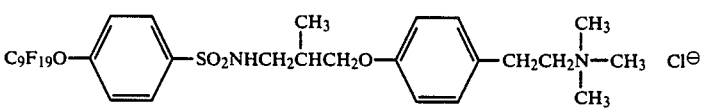

2-80

$$H(CF_2)_{10}CH_2OP(=O)(ONa)_2$$

2-81

$$C_9F_{19}CH_2CH(OH)CH_2O(CH_2CH_2O)_{20}-CH_3$$

2-82

$$C_8F_{17}SO_2N(CH_3)(CH_2CH_2O)_{15}H$$

The examples of commercial fluorine containing surfactants include Unidyne manufactured by Daikin Kogyo Co., Ltd. and Florado manufactured by Sumitomo 3M.

Next, the examples of polyoxyethylene surfactant favorably used in embodying the invention are typified by the following 3 - 1 through 3 - 44.

$C_{11}H_{23}COO(CH_2CH_2O)_8H$ 3-1

$C_{17}H_{33}COO(CH_2CH_2O)_{15}H$ 3-2

$C_8H_{17}O(CH_2CH_2O)_7H$ 3-3

$C_{22}H_{45}O(CH_2CH_2O)_{25}H$ 3-4

-continued 3-5

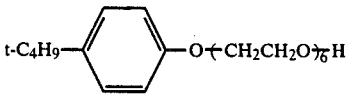

3-6

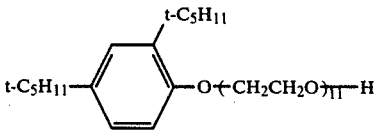

-continued
3-7
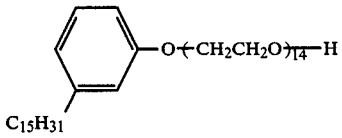
3-8
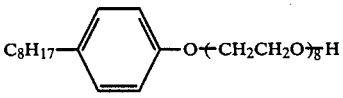
3-9
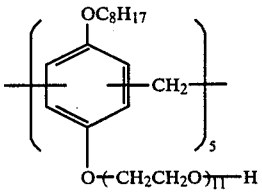
3-10
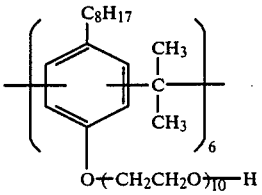
3-11
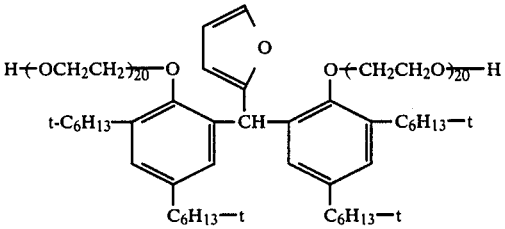
3-12
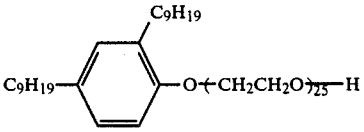
3-13
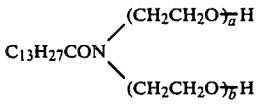
a + b = 15
3-14
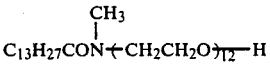
3-15
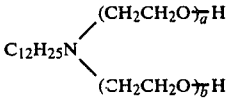
a + b = 20
3-16
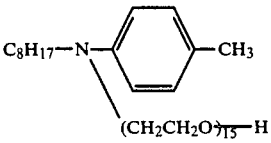
-continued
3-17
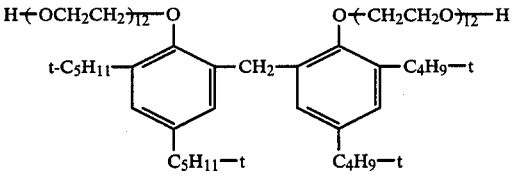
3-18
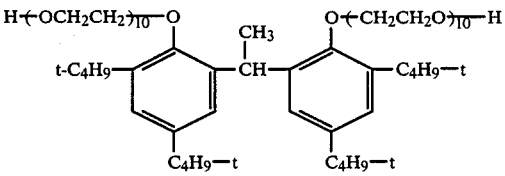
3-19
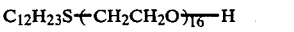
3-20
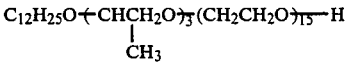
3-21
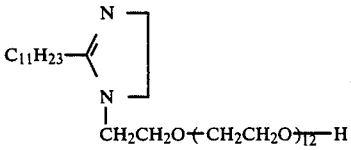
3-22
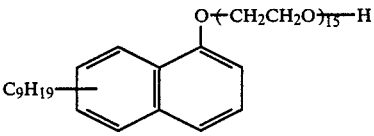
3-23
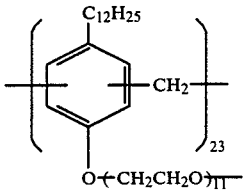
3-24
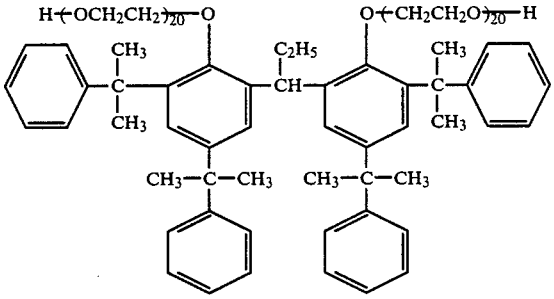
3-25
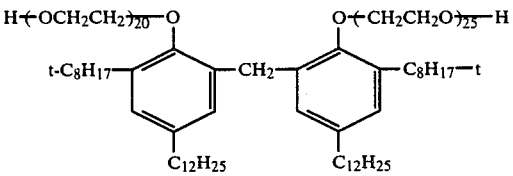

-continued
3-26
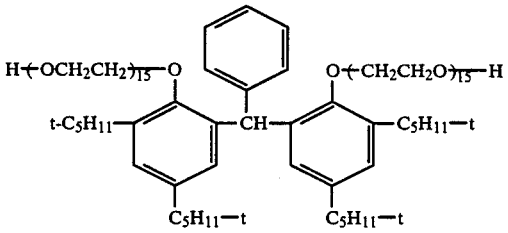
3-27
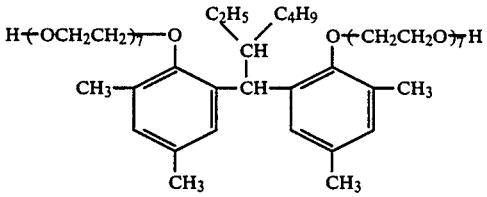
3-28
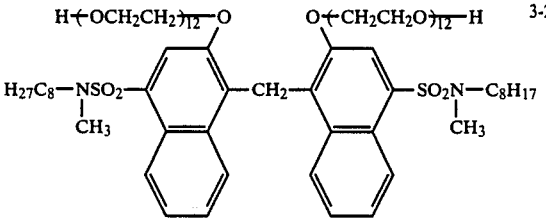
3-29
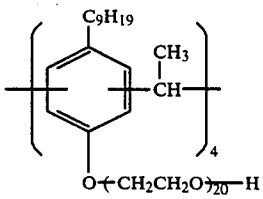
3-30
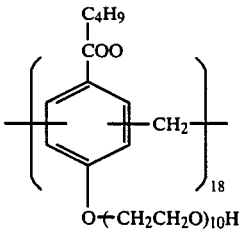
3-31 $C_{12}H_{25}O(OCH_2CH_2)_4(CH_2)_4SO_3Na$
3-32 $C_{18}H_{35}O(CH_2CH_2O)_8(CH_2)_3SO_3Na$
3-33
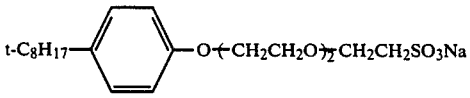
3-34
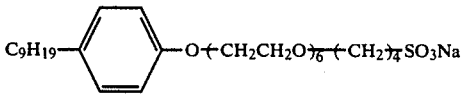
3-35
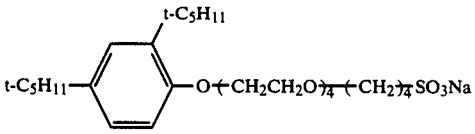
-continued
3-36
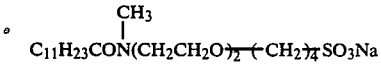
3-37 $C_9H_{19}O(CH_2CH_2O)_4SO_3K$
3-38
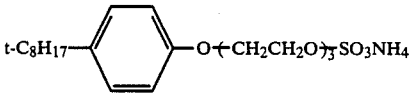
3-39 $C_{18}H_{33}O(CH_2CH_2O)_4SO_3Na$
3-40
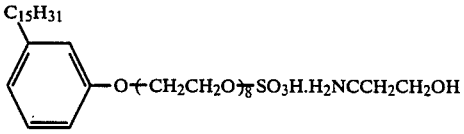
3-41 $C_{12}H_{25}O(CH_2CH_2O)_4CH_2COONa$
3-42
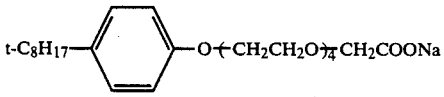
3-43
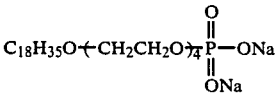
3-44
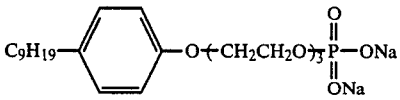
The examples of preferred quaternary ammonium salts are typified by the following 4 - 1 through 4 - 20.
4-1
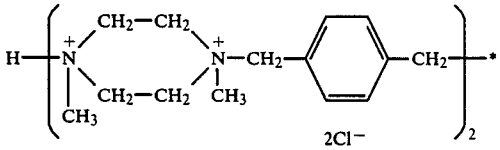
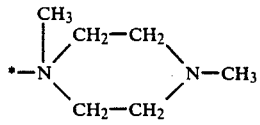
4-2
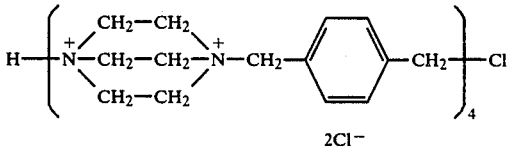
4-3
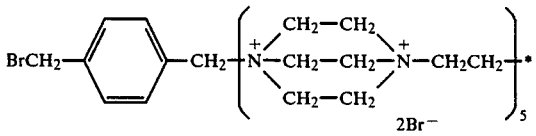

-continued
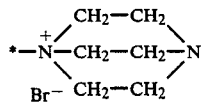
4-4
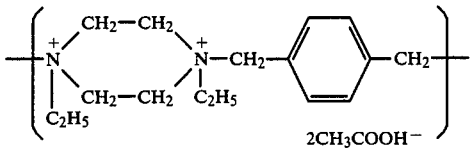
4-5
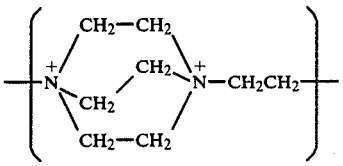
4-6
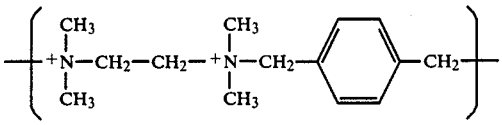
4-7
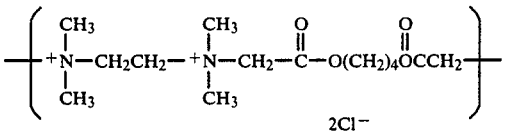
4-8
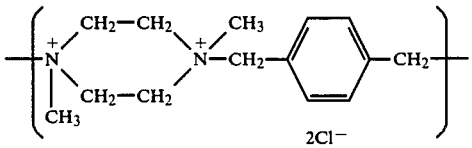
4-9
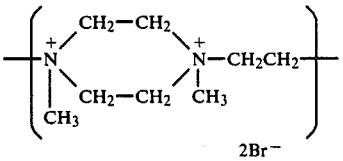
4-10
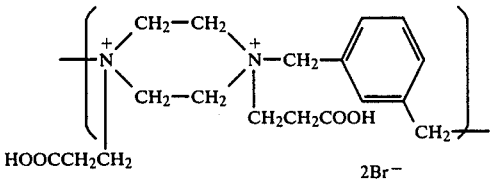
-continued
4-11
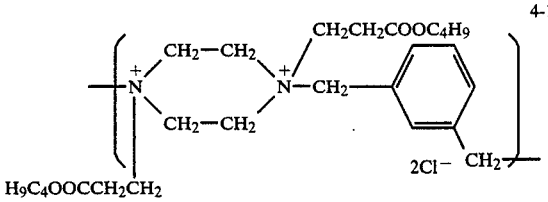
4-12
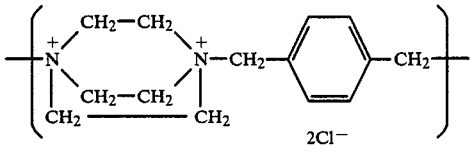
4-13
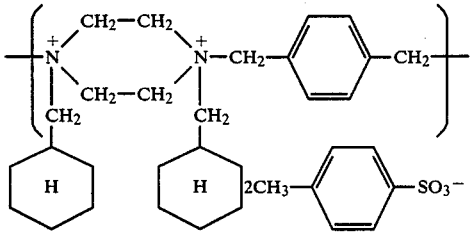
4-14
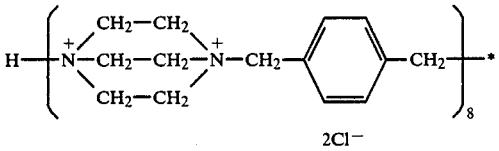
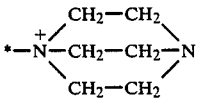
4-15
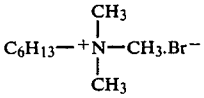
4-16
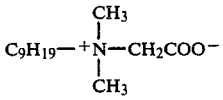
4-17
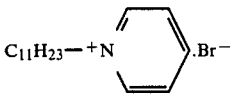
4-18
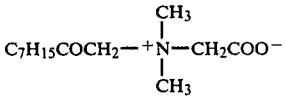
4-19
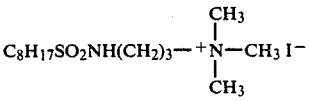

-continued

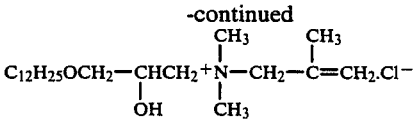

4-20

The particles employed in embodying the invention are hereinunder described. The size distribution of particles employed may be either small or large.

The size distribution of silver halide particles within a photographic emulsion is arbitrarily selected, and the emulsion may be a monodisperse type. The "term-monodisperse" means a dispersion system where sizes of 95% of total particles correspond a range of less than ±60%, or, more favorably, less than ±40% of number average particle size. The term "number average particle size" is the number average diameter of the projected areas of silver halide particles.

The silver halide particles in a photographic emulsion may have a regular crystal configuration such as cube, octahedron, tetradecahedron or dodecahedron, or an irregular configuration such as spheric and tabular ones, or a combination or any of these crystal configurations. Also, silver halide particles may simultaneously involve various crystal configurations.

The silver halide particles may be any of the following crystals: combined silver halide crystals formed by bonding oxide crystals such as of PbO with silver halide crystals such as of silver chloride; epitaxially grown silver halide crystals (for example, on individual silver bromide crystals, silver chloride, silver iodo-bromide, silver iodide or the like is epitaxially grown); crystals comprising hexagonal or regular octagonal silver iodide particles overlapped with regular octagonal silver chloride crystals.

An emulsion, where super-tabular silver halide particles individually having a diameter five times as large as the thickness account for more than 50% of total project area of particles, may be used. The detail of this arrangement is disclosed for example, in Japanese Patent O.P.I. Publication Nos. 127921/1983 and 113927/1983.

In embodying the invention, not only the above regular silver halide particles but the above irregular silver halide particles may be incorporated into the emulsion. However, if used, the latter type of particles should not preferably exceed 50% in terms of weight or number of particles. In an preferred example of the invention, the total amount of silver halide particles involve at least 60 to 70 weight % of regular silver halide particles.

When preparing monodisperse emulsion and/or emulsion containing regular silver halide particles, it is favorable, in supplying silver and halide ions, to increase continuously or step by step the growth speed of crystal particles in conformity with the critical growth speed or within an allowable range of the similar speed, so that an amount of silver halide necessary for exclusively allowing already formed crystal particles to grow may be supplied without dissolving the already formed crystal particles nor allowing new particles to generate and grow. Such a method to accelerate the growth speed gradually is disclosed in Japanese Patent Publications Nos. 36890/1973 and 16364/1977, and in Japanese Patent O.P.I. Publication No. 142329/1980.

In embodying the invention, the silver halide particles used in the silver halide emulsion are prepared in compliance with any of the neutral method, acid method, ammonium method, normal precipitation method, reverse precipitation method, double jet precipitation method, controlled double jet precipitation method, conversion method, core/shell method and the like disclosed in the literatures such as The Theory of the Photographic Process, 4th edition, by T. H. James, published from MacMillan (1977); Chimie et Physique Photographique, by P. Glfkides, published from Paul Montel (1967); Photographic Emulsion Chemistry, by G. F. Duffin, published from The Focal Press (1966); Making and Coating Photographic Emulsion, by V. L. Zelikman et al, published from The Focal Press (1964); and others.

In addition, as another type of double jet precipitation method, a triple jet precipitation method, where soluble halides of different compositions, for example, soluble silver salt, soluble bromide and soluble iodide, are independently added, is also useful.

A method to form particles in the presence of excess silver ions, the so-called reverse precipitation method, may be used. As one type of the double-jet precipitation method, the controlled double jet method, which keeps pAg level constant in the liquid phase where silver halide is formed, is also useful.

To control the growth of particles in forming the silver halide particles, the following silver halide solvents are useful: ammonium, potassium rhodate, ammonium rhodate and thioether compounds, disclosed for example in U.S. Pat. Nos. 3,271,157, 3,574,628, 3,704,130, 4,297,439 and 4,276,374; thionic compounds, disclosed for example in Japanese Patent O.P.I. Publications Nos. 144,319/1978, 82,408/1978 and 77,737/1980; amine compounds disclosed for example in Japanese Patent O.P.I. Publication No. 100,717/1979; and others. However, ammonium is advantageous for this purpose.

More than two independently prepared silver halide emulsions may be mixed together to prepare one emulsion.

These silver halide particles or silver halide emulsions should preferably contain at least one salt (soluble salt) of iridium, thallium, palladium, rhodium, zinc, nickel, cobalt, uranium, thorium, strontium, tungsten or platinum. The preferred amount of such a salt is $10^{-6}$ to $10^{-1}$ mol per mol Ag. Most advantageously, the particles or emulsions contain at least one salt selected from those of thallium, palladium and iridium. These salts may be either independently or combinedly used. The timing of adding such a salt is arbitrarily selected. By incorporating such a salt, various effects may be resulted; for example, improvement of flash exposure characteristics, prevention of pressure desensitization, prevention of fading of the latent image, and sensitization.

Im embodying the invention, the preferred example is such that the pAg level of parent solution containing protective colloid, while particles are allowed to grow, as mentioned above, prior to the chemical sensitization, is at least 10.5. In a particularly advantageous example, the parent solution is subjected at least once to an atmosphere of pAg level more than 11.5 with excess bromine ions. This arrangement increases the (111) faces and makes individual particles more spheric, thus further enhancing the effects of the present invention. In this case, the (111) faces of particles should preferably account for more than 5% of the total surface area of particles.

In this case, the increase in (111) faces (increase over the proportion of the similar faces which have not yet been subjected to the above-mentioned atmosphere of more than a 10.5 of pAg) should be preferably more than 10%, in particular, 10 to 20%.

How to determine whether the external surface of silver halide particles are covered with (111) faces or (100) faces as well as how to measure the proportion between both types of faces are described in a report by Akira Hirata, that is "Bulletine of the Society of Scientific Photography of Japan", No. 13, pp. 5–15, (1963).

Whether or not the (111) faces have increased more than 5% by subjecting a parent solution containing protective colloid, while particles are allowed to grow prior to chemical sensitization, to an atmosphere of more than 10.5 of pAg is readily determined with the method by Hirata.

In this case, the above-mentioned pAg level should be preferably reached after approximately two thirds of the total amount of silver have been added and before the desalination process which is usually performed prior to the chemical sensitization. This is because this arrangement is useful in providing a monodisperse emulsion having a smaller particle size distribution.

The ripening in an atmosphere having the pAg level of more than 10.5 is preferably performed for more than two minutes.

Controlling the pAg in this manner increases the (111) face more than 5%, and individual particles becomes more spheric, thus providing advantageous particles whose (111) faces account for more than 5% of total surface areas of particles.

To remove soluble salts from an emulsion already having precipitation or already chemically ripened, the following methods are available: noodle water-rinsing method, where the removal is effected by promoting the gelation of gelatin; flocculation method which uses an inorganic salt, anionic surfactant, anionic polymer such as polystyrene sulfonate or gelatin derivative such as acyl gelatin, carbamoyl gelatin. The process to remove soluble salts may be omitted.

Although the silver halide emulsion is preferably chemically sensitized, but it may not be sensitized. For chemical sensitizing the emulsion, for instance, the methods described in Die Grundlagen der Photographischen Prozess mit Silberhalogenieden, Akademishe Verlagegeselshaft, 1968, p.67–734 can be used.

The silver halide emulsion useful in the invention may be optically sensitized with a dye known in the photographic art as a sensitizing dye so that it may be particularly sensitive in a required wavelength range. Sensitizing dyes may be independently used, or otherwise, more than two of them may be combinedly used. In addition to a sensitizing dye, the emulsion may contain a supersensitizer which is a dye not providing spectral sensitizing function or a compound not absorbing visible light but enhances the sensitizing action of sensitizing dye.

As a sensitizing dye used in the blue-sensitive silver halide emulsion layer, or as a sensitizing dye used in the green-sensitive silver halide emulsion layer, or as a red-sensitive silver halide emulsion layer, various dyes are available. These dyes may be independently used, or otherwise, various combinations of dyes may be used. The combination of sensitizing dyes is often used especially for the supersensitizing purpose.

As a dye used together with a sensitizing dye and not having a spectral sensitizing capability, or a substance similarly used and not absorbing a visible light but providing supersensitization activity, the aromatic organic acid-formardehyde condensation products (for example, those disclosed in U.S. Pat. No. 3,437,510), and cadmium salts, azaindene compound, and aminostylbene compounds having a nitrogen-containing heterocyclic substituent.

One preferred embodiment of the invention is provided by incorporating, into a light-sensitive silver halide emulsion layer, at least one sensitizing dye selected from a group of compounds which are expressed by the following formula [I], [II] or [III].

Employing a compound expressed by the formula [I], [II] or [III] orthochromatically sensitizes the light-sensitive silver halide emulsion layer. Accordingly, the similar layer becomes further resistant to pressure desensitization and scratch-induced fogging. To be more specific, the regular type light-sensitive material involves larger particles to improve the sensitivity in the toe area of a sensitometric characteristic curve, because this area requires especially high sensitivity. However, this arrangement incurs the poor resistance to the pressure desensitization and scratch-induced fogging. In contrast, since an ortho type light-sensitive material is highly sensitized by the dye sensitization, smaller silver halide particles may be used. Correspondingly, the pressure desensitization and scratch-induced fogging characteristics are further improved.

The general formulas [I], [II] and [III] are described below.

General formula [I]

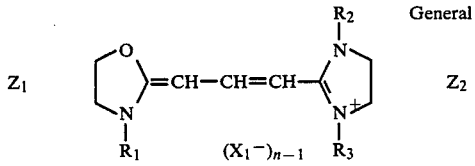

[wherein, $R_1$, $R_2$ and $R_3$ independently represent an alkyl group, alkenyl group or aryl group each of which is allowed to have a substituent, and at least one of $R_1$ and $R_2$ is a sulfoalkyl group or carboxyalkyl group.

$X_1^-$represents an anion, $Z_1$ and $Z_2$ independently represent a group of non-metal atoms necessary to complete a substituted or unsubstituted carbon ring, and n represents 1 or 2 (if forming an intramolecular salt, n represents 1)].

[II]

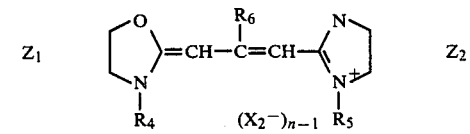

[wherein, $R_4$ and $R_5$ independently represent an alkyl group, alkenyl group or aryl group each of which is allowed to have a substituent, and at least one of $R_4$ and $R_5$ is a sulfoalkyl group or carboxyalkyl group. $R_6$ represents a hydrogen atom, lower alkyl group or aryl group. $X_2^{31}$ represents an anion, $Z_1$ and $Z_2$ independently represent a group of non-metal atoms necessary to complete a substituted or unsubstituted carbon ring, and n represents 1 or 2, if forming an intramolecular salt, n represents 1].

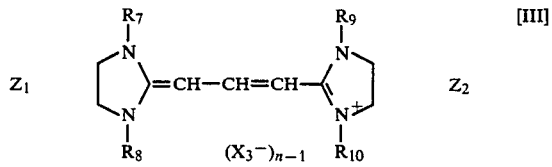

[III]

Wherein $R_7$ and $R_8$ independently represent a lower alkyl group each of which may have a substituent; $R_9$ and $R_{10}$ independently represent a lower alkyl group, a hydroxyalkyl group, a sulfoalkyl group or a carboxyalkyl group; $X_3^-$ is an anion; $Z_1$ and $Z_2$ independently represent a group of non-metallic atoms necessary to complete a substituted or unsubstituted carbon ring; and n is an integer of 1 or 2 provided that n is 1 when an intramolecular salt is formed.

In each formula, the carbon ring $Z_1$ or $Z_2$ forms should be preferably an aromatic ring such as a substituted or unsubstituted benzene or haphthalene ring.

The typical examples of compound expressed by each of these formulas are described in Japanese Patent O.P.I. Publication No. 80327/1986, and a compound arbitrarily selected from those compounds disclosed in the patent may be used in embodying the invention.

The total amount of adding compounds expressed by any of the above formulas [I] through [III] is within a range of 50 mg to 1200 mg per mol silver halide. However, the amount of 100 mg to 1000 mg is particularly advantageous.

The timing for adding the compound expressed by any of the above formulas [I], [II] and [III] is arbitrarily selected from any time points within the preparation of light-sensitive material. For example, the compound is incorporated into the material prior to the chemical ripening, during the chemical ripening, after the chemical ripening or before the coating process.

Into the photographic emulsion used in the invention may be incorporated various compounds in order to prevent the fogging during the preparation, storage and photographic processing of the light-sensitive material, or to ensure stable photographic performance.

To improve the flexibility, a plasticizer may be added to the silver halide emulsion layer and/or other hydrophilic colloid layer of the light-sensitive material according to the invention.

Various compounds are useful as a plasticizer. In particular, trimethylolpropane is advantageous. When a diol such as trimethylolpropane, or a polyol is used, the preferred amount of addition per amount of gelatin is 0.01 to 100 weight %, in particular, 0.1 to 100 weight %, or more specifically, 0.1 to 10 weight %.

To prevent the fogging which may occur during the preparation, storage and photographic processing of the photographic light-sensitive material, or to ensure stable photographic performance of the material, various compounds may be incorporated into the photographic emulsion used in embodying the invention.

For more details of such compounds, the literatures should be referred to; such literatures include Stabilization of Photographic Silver Halide Emulsions, by E. J. Birr, published from Focal Press, 1974.

To the light-sensitive material of the invention, a water-soluble dye may be added for various purposes; for example, as a filter dye to a hydrophilic colloid layer, or for the prevention of irradiation and halation.

If the light-sensitive material of the invention contains in a hydrophilic colloid layer a dye, ultraviolet absorbent and the like, these compounds may be mordanted with a cationic polymer or the like.

The dyes useful for this purpose are those disclosed in "Absorbing and Filter dyes" in Research Disclosure, vol. 176, pp. 23–26.

To intensify the sensitivity and contrast or to accelerate developing, the photographic emulsion layer in the photographic light-sensitive material of the invention may contain, for example, any of the following compounds: polyalkylene oxide or ether derivative, ester derivative or amine derivative thereof; thioether compound, thiomorpholine, quaternary ammonium chloride, urethane derivative, urea derivative, imidazole derivative, 3-pyrazolidone and the like.

Gelatin is advantageous as a binder or protective colloid which may be used in the emulsion layer and intermediate layer of the light-sensitive material of the invention. However, another hydrophilic colloid may be independently, or together with gelatin, used.

The photographic light-sensitive material of the invention may, in the photographic emulsion layer and other hydrophilic colloid layers, contain an inorganic or organic hardener.

To improve the dimension stability and for other purposes, the photographic light-sensitive material of the invention may, in the photographic emulsion layer and other hydrophilic colloid layers, contain a water-soluble or slightlysoluble synthetic polymer dispersion.

It is advantageous to incorporate a protective layer into the silver halide photographic light-sensitive material of the invention. The protective layer is made of a hydrophilic colloid, thereby the useful hydrophilic colloid is selected from the previously mentioned examples. The protective layer may comprise either a single layer or a plurality of layers.

To the emulsion layer or protective layer of the silver halide photographic light-sensitive material of the invention, preferably to the protective layer, may be added a matting agent and/or lubricant.

One example of silver halide photographic light-sensitive material embodying the invention contains a matting agent, and the mattness is 40 to 150 mmHg. The term "mattness" means a value expressed in mmHg which is determined under a specific condition by measuring a suction force on an unprocessed light-sensitive material (the so-called raw film) which has been treated to provide a constant humidity for three hours under 23° C. and 48%Rh. The larger the value is, the greater the degree of mattness. To measure a suction force in the examples later described, the Smoostar (manufactured by Toei Denshi Kogyo Co., Ltd.) was used.

According to the invention, a matting agent should be contained preferably in the outermost layer of light-sensitive material or a layer functioning as the outermost layer, or a layer in the vicinity of outermost layer, and in a layer functioning as a protective layer.

The preferred amount of added matting agent is 10 to 500 mg/m$^2$, in particular, 20 to 300 mg/m$^2$, or more specifically, 20 to 200 mg/m$^2$ per one side of the light-sensitive material. Additionally, an identical type of, or different types of matting agent may be added to more than two layers. In this case, a layer to contain the matting agent may be arbitrarily selected from the emulsion layer and protective layer, as well as the subbing layer and intermediate layer which are provided according to a specific requirement.

The size distribution of particles of matting agent used in the invention may be either small or large, however, the use of monodisperse matting agent is advantageous. The "monodisperse matting agent" means a matting agent in which the quantity of particles whose diameters being within a range of ±20% of average particle size accounts for 90% of the whole particles. The type of matting agent is arbitrarily selected, for example, from the known agents. To be more specific, the useful matting agent comprises water-insoluble organic or inorganic fine particles with an arbitrarily particle size. Preferably, the agent with a particle size of 1 μm to 10 μm is used. The preferred examples of such organic compound are as follows: water-dispersion vinyl polymers such as polymethyl acrylate, polymethyl methacrylate, polyacrylonitrile, acrylonitrile-β-methylstyrene copolymer, polyvinyl acetate, polyethylene carbonate and polytetrafluoroethylene; cellulose derivatives such as methyl cellulose, ethyl cellulose, cellulose acetate and cellulose acetate propionate; starch derivatives such as carboxy starch, carboxy nitrophenyl starch and urea-formadehyde-starch reaction product; gelatin hardened with a known hardener; hardened gelatin which are formed into hollow microcapsules by hardening with coacervation; and others. The preferred examples of such in organic compound are as follows: silicon dioxide, titanium dioxide, magnesium dioxide, aluminum oxide, barium sulfate and calcium carbonate; silver chloride and silver bromide both being desensitized with a known method; glass, diatomaceous earth and others. Any of the above matting agents may be used as mixed with a different type of material according to a specific requirement.

The photographic light-sensitive material of the invention may contain various additives in compliance with a requirement. For example, a dye, development accelerator, fluorescent whitening agent, color-fog restrainer, ultraviolet absorbent and the like. More specifically, those useful for this purpose are disclosed in Research Disclosure, vol. 176, pp. 22–31 (RD-17643, 1978).

Other than the previously mentioned layers, the silver halide photographic light-sensitive material of the invention may; be provided with an anti-halation layer, intermediate layer, filter layer and others.

With the photographic light-sensitive material of the invention, the layers including the photographic emulsion layer are formed by coating on a single side or both sides of a flexible support which is usually employed in a photographic light-sensitive material. The support may be colored with a dye or pigment. To shield light, the support may be provided with dark shade. The surface of a support is usually subbed to ensure better adherence to a photographic emulsion layer and the like. The surface of a support may be subjected to corona discharge, ultraviolet irradiation, flame treatment or the like before or after the subbing treatment. More specifically, the treatments to be used are disclosed in "Supports" in Research Disclosure, vol. 176, p. 25.

With the photographic light-sensitive material of the invention, the hydrophilic colloid layers including the photographic emulsion layer are formed by coating methods on the support or another layer. The useful coating methods include the dip coating method, roller coating method, curtain coating method, extrusion coating method and others. More specifically, the applicable methods are disclosed in "Coating Procedures" in Research Disclosure, vol. 176, pp. 27–28.

As a method to apply a coating solution on one side of a support and without delay apply a coating solution on the other side before the first applied solution is dried, those methods described in Japanese Patent O.P.I. Publication No. 63163/1982 and Japanese Patent Publications Nos. 38737/1976 and 17853/1974 and others are available.

The preferred embodiments of the invention are hereinunder described by referring to the examples.

FIG. 1 illustrates one example of coating apparatus suitable for coating process for the silver halide light-sensitive material of the invention, wherein a coater and an air blower substantially opposing to each other are disposed across a continuously fed support, thereby the position of support is maintained by means of air blowing from the air blower onto the support while the coater is applying a coating solution.

Figure 2:
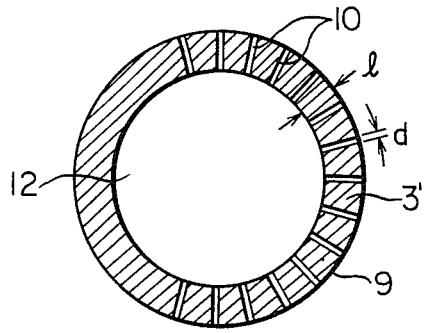
FIG. 2 is a longitudinal cross section illustrating one example of air blower.

FIG. 1 is a longitudinal cross section of a coating apparatus, wherein a two-layer coating method by a slide hopper is exercised to continuously apply coating solutions for photographic structural layers onto both sides of a support. FIG. 2 is a longitudinal cross section illustrating one example of air blower associated with the coating apparatus.

As shown in FIG. 1, a support 2 to be coated with a coating solution at first comes into direct contact with a supporting roller 3, thereby coated by a conventionally known method. To make the formed layer 4 gelate, the support 2 is passed through a cool air zone 8. In the cool air zone 8, the cool air is blown onto the coated surface 4 via a slit plate or a group of small holes 7. To enhance the cooling effect on the gelation of formed layer 4, it is desirable that the other surface of support 2 not coated should be contacted with an array of rollers 6 which are disposed within a central box 5 and in which the rollers are arranged at 2 to 3 mm intervals, and that the suction force is exerted from behind the array of rollers 6 so as to enlarge the contact area between the array of rollers 6 and the support 2. Then, at the non-contact supporting portion of an air blower 3', one side the support 2 already provided with a gel layer on the other side is formed a layer 11 by means of a coater 1' which is disposed as opposed to the air blower 3' across the support 2. The air blower 3' may be variously configured. However, a rollerconfigured blower, which appears to be used most widely because it will allow easy manufacturing procedure, is described below.

The air blower 3' having a hollow roller constitution has, in its outer shell serving as the non-contact supporting portion, a plurality of through holes 10 to eject air. The air supplied into the interior of the roller is blown from the external circumferential surface of the roller 9 onto the gel layer 4 via the through holes 10, in order to exert lifting force onto the support 2 on the non-contact basis. In preparing a photographic light-sensitive material, the fluctuation in thickness of formed emulsion layer whether it is wet or dry should be less than ±1%. Accordingly, it is necessary that the gap or distance of between the tip of coater 1' and the surface on the support 2 to be coated with an emulsion should be maintained as constant as possible. The allowable fluctuation in the gap is preferably within several, or, 10μat the maximum.

When an air blower 3' comprises a hollow roller having through holes 10, the means to control the fluctuation in distance of floatation, it is possible to set not only a specific value for the ratio between the supporting static pressure (back pressure) and source pressure at a specific value between 1/10 and 1/1000 but the distance of floatation at the area in contact with a coating solution at a specific value between 20 μm and 500 μm, by deliberately designating the diameter d (FIG. 2) and length l (FIG. 2) of the narrowest portion of the through holes 10, and the ratio of opening (the ratio of how much the total area of cross sections of all the through holes 10 at the narrowest portion accounts for the external surface area of the air blower 3'), as well as the external diameter of roller, and by controlling both the tension on support and the source pressure. This arrangement ensures the fluctuation in floatation distance of the flexible support, which is coated with a coating solution, to be kept within the above-mentioned allowance.

The correlation between the support and the amount of blown air should be preferably regulated to satisfy $W^2 \cdot Q \leqq 5 \times 10^5$, where W is the width of support (cm), Q is the amount of blown air per unit area ($Nml/min \cdot cm^2$)

The silver halide photographic light-sensitive material of the invention is typically used as an X-ray light-sensitive material, lith light-sensitive material, monochromatic film, color negative light-sensitive material color reversal light-sensitive material or color printing paper, or for the colloid transfer process, silver salt diffusion transfer process, dye transfer process, silver dye bleaching process, or as a printout sensitive material, light-sensitive material for thermal developing, or the like.

An ordinary exposure method may be used to obtain a photographic image with the light-sensitive material of the invention.

The light-sensitive material of the invention may be photographically processed with any of the methods and various processing solutions disclosed, for example, in Research Disclosure, Vol. 176, pp. 25–30, (RD-17,643). The photographic process may be a photographic process to form either a silver image (monochromatic photographic process) or a dye image (color photographic process), in accordance with a specific requirement. The processing temperature is usually selected from a range of 18° C. to 50° C. However, the temperature may be lower than 18° C. or higher than 50° C.

The photographic emulsion layer of the photographic light-sensitive material of the invention may contain a dye forming coupler which is a compound being capable of forming a dye, in the course of color developing, by oxidization-coupling with an aromatic primary amine developing agent (for example, a phenylenediamine derivative, aminophenol derivative and the like).

Additionally, the similar emulsion layer may contain a non-color DIR coupling compound, which releases development restrainer, whose coupling-reaction product has no color.

The silver halide photographic light-sensitive material of the invention may contain, as an anti-fogging agent, a hydroquinone derivative, aminophenol derivative, gallic acid derivative, ascorbic acid derivative or the like.

The silver halide photographic light-sensitive material of the invention may contain in the hydrophilic colloid layer an ultraviolet absorbent.

In embodying the invention, an anti-fading agent may be also used.

EXAMPLES

The invention is hereinunder described by referring to examples. Needless to say, the scope of invention is not limited only to these examples.

EXAMPLES 1

First, silver iodo-bromide emulsion E - 1 containing 2.0 mol % silver iodide was prepared by the full-ammonia normal precipitation method. The average particle size of the silver iodide in the emulsion was 1.10 μm. Chloroauric acid, sodium thiosulfate and ammonium thiocyanate were added to the silver iodo-bromide emulsion E - 1 in order to perform the optimized gold/sulfur sensitization, then the emulsion was stabilized with 4-hydroxy-6-methyl-1,3,3a-7-tetrazaindene.

With the slide hopper method, and at a rate of 100 m/min., the two layers were simultaneously formed on one face (front side) of a support made of polyester film having a subbing layer; one layer is a protective layer which containing a hardener, and the other is the silver halide emulsion layer disposed between the protective layer on the support. Then, the layers were allowed to set the gel, and dried, then wound up with a tension of 10.5 kg/36 cm. The other face of support (rear face) was coated in compliance with the conditions identical to those of the front face, then the two-layer coat was allowed to gelate and dried. Thus, samples No. 1 through No. 30 were prepared.

Next, the similarly prepared emulsions were simultaneously applied to the front face of polyester support having a subbing layer, in accordance with the method of the invention, in order to form a two-layer coat, then, immediately applied to the rear face of the support, thereby both coats were allowed to gelate and simultaneously dried. Thus, samples No. 31 through 60 were prepared.

The amount of applied silver in each of the prepared samples was at a rate of 54 $mg/cm^2$, and the amount of hardener was regulated so that the melting time of approximately 7 minutes was attained. The term "melting time" means the duration where a sample of silver halide photographic light-sensitive material cut into 1 cm by 2 cm chip is immersed into 1.5 aqueous sodium hydroxide solution having a constant temperature of 50° C. and the emulsion layer eventually starts to melt.

With each sample prepared in the above manner, the number of coating defects (for example, coating streak, coating mottle and the like) were counted, whereby evaluation was made using five grades, that is, 1 (poor) through 5 (excellent). The grades 3 through 5 satisfy the criteria for practical use, while the grades 1 and 2 fail to satisfy the similar criteria.

Additionally, the sensitivity was measured in the following manner; a sample was sandwiched between two optical wedges which are aligned with each other so that the density gradients constitute the symmetry relative to plane, thereby both faces were simultaneously exposed for 1/12.5 seconds with a light source having a color temperature of 5400° K.

The photographic process comprised the following steps and employed a roller transporting type, automatic developing machine. The total processing time was 45 seconds.

| | Processing temperature | Processing time |
|---|---|---|
| Loading | — | 1.2 sec. |
| Developing + interface | 35° C. | 14.6 sec. |
| Fixing + interface | 33° C. | 8.2 sec. |
| Rinsing + interface | 25° C. | 7.2 sec. |
| Squeezing | 40° C. | 5.7 sec. |
| Drying | 45° C. | 8.1 sec. |
| Total | — | 45.0 sec. |

The developer used was XD-90, and the fixer used was XF, both manufactured by Konishiroku Photo Industry Co., Ltd.

With each sample, and using the resultant characteristic curve which illustrates the interrelation between the logE (logarithm of exposure) and D (optical density), the exposure corresponding to (base density +fog density +1.0), thereby the relative sensitivity was determined.

Additionally, with each sample, the drying properties were evaluated in the following manner. After being subjected to the above 45 seconds automatic developing, and drying, a sample was examined for handling touch, degree of sticking with another sample, and other items, thereby the performance was expressed using five grades, that is, 1 (poor) through 5 (excellent). The grades 3 through 5 satisfy the criteria for practical use, while the grades 1 and 2 fail to satisfy the similar criteria. The results for all the samples are listed in Tables 1-1 and -2.

Additionally, to determine the sensitivity with the conventional 90 seconds treatment, some of the samples were subjected to the process with the above-mentioned 45 seconds automatic developing machine whose line speed being reduced to ½ of the original. The results are listed in Table 2.

TABLE 1

| | Silver halide emulsion layer | | | | Protective layer | | | | | | | | | |
|---|---|---|---|---|---|---|---|---|---|---|---|---|---|---|
| | Amount of gelatin ($g/m^2$) | Surfactant | | Surface tension | Amount of gelatin ($g/m^2$) | Surfactant | | Surface tension | Total of gelatin ($g/m^2$) | Coating defects | | | | (Note) |
| Sample No. | (per face) | Type | Amount per face ($g/m^2$) | (dyn/cm) | (per face) | Type | Amount per face ($g/m^2$) | (dyn/cm) | (per face) | Front face | Rear face | Sensitivity | Drying properties | Invention or not |
| 1 | 2.30 | 1-10 | $1 \times 10^{-3}$ | 36 | 1.15 | 1-10 | $8 \times 10^{-4}$ | 30 | 3.45 | 5 | 5 | 70 | 1 | no |
| 2 | 2.30 | 1-10 | $1 \times 10^{-3}$ | 36 | 1.15 | 1-10 | $1.1 \times 10^{-3}$ | 27 | 3.45 | 5 | 4 | 70 | 1 | no |
| 3 | 2.30 | 1-10 | $1 \times 10^{-3}$ | 36 | 1.15 | 1-10 | $2 \times 10^{-3}$ | 25 | 3.45 | 5 | 4 | 70 | 1 | no |
| 4 | 2.30 | 1-10 | $1 \times 10^{-3}$ | 36 | 1.15 | 1-10 | $3.5 \times 10^{-3}$ | 20 | 3.45 | 5 | 3 | 70 | 1 | no |
| 5 | 2.30 | 1-10 | $1 \times 10^{-3}$ | 36 | 1.15 | 1-10 | $5 \times 10^{-3}$ | 15 | 3.45 | 5 | 3 | 70 | 1 | no |
| 6 | 2.10 | 1-10 | $1 \times 10^{-3}$ | 36 | 1.15 | 3-4 | $6 \times 10^{-4}$ | 30 | 3.25 | 4 | 4 | 80 | 2 | no |
| 7 | 2.10 | 1-10 | $1 \times 10^{-3}$ | 36 | 1.15 | 3-4 | $8 \times 10^{-4}$ | 27 | 3.25 | 4 | 4 | 80 | 2 | no |
| 8 | 2.10 | 1-10 | $1 \times 10^{-3}$ | 36 | 1.15 | 3-4 | $1 \times 10^{-3}$ | 25 | 3.25 | 5 | 3 | 80 | 2 | no |
| 9 | 2.10 | 1-10 | $1 \times 10^{-3}$ | 36 | 1.15 | 3-4 | $3 \times 10^{-3}$ | 20 | 3.25 | 5 | 3 | 80 | 2 | no |
| 10 | 2.10 | 1-10 | $1 \times 10^{-3}$ | 36 | 1.15 | 3-4 | $7 \times 10^{-3}$ | 15 | 3.25 | 5 | 2 | 80 | 2 | no |
| 11 | 2.00 | 1-10 | $1 \times 10^{-3}$ | 36 | 1.15 | 2-81 | $4 \times 10^{-4}$ | 30 | 3.15 | 4 | 4 | 100 | 3 | no |
| 12 | 2.00 | 1-10 | $1 \times 10^{-3}$ | 36 | 1.15 | 2-81 | $2 \times 10^{-3}$ | 27 | 3.15 | 4 | 3 | 100 | 3 | no |
| 13 | 2.00 | 1-10 | $1 \times 10^{-3}$ | 36 | 1.15 | 2-81 | $4 \times 10^{-3}$ | 25 | 3.15 | 5 | 3 | 100 | 3 | no |
| 14 | 2.00 | 1-10 | $1 \times 10^{-3}$ | 36 | 1.15 | 2-81 | $1.5 \times 10^{-2}$ | 20 | 3.15 | 5 | 2 | 100 | 3 | no |
| 15 | 2.00 | 1-10 | $1 \times 10^{-3}$ | 36 | 1.15 | 2-81 | $4 \times 10^{-2}$ | 15 | 3.15 | 5 | 2 | 100 | 3 | no |
| 16 | 1.70 | 1-10 | $1 \times 10^{-3}$ | 36 | 1.00 | 2-81 | $4 \times 10^{-4}$ | 30 | 2.70 | 3 | 3 | 110 | 4 | no |
| 17 | 1.70 | 1-10 | $1 \times 10^{-3}$ | 36 | 1.00 | 2-81 | $2 \times 10^{-3}$ | 27 | 2.70 | 4 | 3 | 110 | 4 | no |
| 18 | 1.70 | 1-10 | $1 \times 10^{-3}$ | 36 | 1.00 | 2-81 | $4 \times 10^{-3}$ | 25 | 2.70 | 4 | 2 | 110 | 4 | no |
| 19 | 1.70 | 1-10 | $1 \times 10^{-3}$ | 36 | 1.00 | 2-81 | $1.5 \times 10^{-2}$ | 20 | 2.70 | 5 | 2 | 110 | 4 | no |
| 20 | 1.70 | 1-10 | $1 \times 10^{-3}$ | 36 | 1.00 | 2-81 | $4 \times 10^{-2}$ | 15 | 2.70 | 5 | 1 | 110 | 4 | no |
| 21 | 1.25 | 1-10 | $1 \times 10^{-3}$ | 36 | 1.00 | 2-82 | $2 \times 10^{-4}$ | 30 | 2.25 | 2 | 2 | 120 | 5 | no |
| 22 | 1.25 | 1-10 | $1 \times 10^{-3}$ | 36 | 1.00 | 2-82 | $1 \times 10^{-3}$ | 27 | 2.25 | 2 | 2 | 120 | 5 | no |
| 23 | 1.25 | 1-10 | $1 \times 10^{-3}$ | 36 | 1.00 | 2-82 | $2 \times 10^{-3}$ | 25 | 2.25 | 3 | 1 | 120 | 5 | no |
| 24 | 1.25 | 1-10 | $1 \times 10^{-3}$ | 36 | 1.00 | 2-82 | $7.5 \times 10^{-3}$ | 20 | 2.25 | 3 | 1 | 120 | 5 | no |
| 25 | 1.25 | 1-10 | $1 \times 10^{-3}$ | 36 | 1.00 | 2-82 | $2 \times 10^{-2}$ | 15 | 2.25 | 4 | 1 | 120 | 5 | no |
| 26 | 1.10 | 1-10 | $1 \times 10^{-3}$ | 37 | 1.00 | 2-82 | $2 \times 10^{-4}$ | 30 | 2.10 | 1 | 1 | 135 | 5 | no |
| 27 | 1.10 | 1-10 | $1 \times 10^{-3}$ | 37 | 1.00 | 2-82 | $1 \times 10^{-3}$ | 27 | 2.10 | 1 | 1 | 135 | 5 | no |
| 28 | 1.10 | 1-10 | $1 \times 10^{-3}$ | 37 | 1.00 | 2-82 | $2 \times 10^{-3}$ | 25 | 2.10 | 2 | 1 | 135 | 5 | no |
| 29 | 1.10 | 1-10 | $1 \times 10^{-3}$ | 37 | 1.00 | 2-82 | $7.5 \times 10^{-3}$ | 20 | 2.10 | 2 | 1 | 135 | 5 | no |
| 30 | 1.10 | 1-10 | $1 \times 10^{-3}$ | 37 | 1.00 | 2-82 | $2 \times 10^{-2}$ | 15 | 2.10 | 2 | 1 | 135 | 5 | no |
| 31 | 2.30 | 1-10 | $1 \times 10^{-3}$ | 36 | 1.15 | 1-10 | $8 \times 10^{-4}$ | 30 | 3.45 | 5 | 5 | 70 | 1 | no |
| 32 | 2.30 | 1-10 | $1 \times 10^{-3}$ | 36 | 1.15 | 1-10 | $1.1 \times 10^{-3}$ | 27 | 3.45 | 5 | 5 | 70 | 1 | no |
| 33 | 2.30 | 1-10 | $1 \times 10^{-3}$ | 36 | 1.15 | 1-10 | $2 \times 10^{-3}$ | 25 | 3.45 | 5 | 5 | 70 | 1 | no |
| 34 | 2.30 | 1-10 | $1 \times 10^{-3}$ | 36 | 1.15 | 1-10 | $3.5 \times 10^{-3}$ | 20 | 3.45 | 5 | 5 | 70 | 1 | no |
| 35 | 2.30 | 1-10 | $1 \times 10^{-3}$ | 36 | 1.15 | 1-10 | $5 \times 10^{-3}$ | 15 | 3.45 | 5 | 5 | 70 | 1 | no |
| 36 | 2.10 | 1-10 | $1 \times 10^{-3}$ | 36 | 1.15 | 3-4 | $6 \times 10^{-4}$ | 30 | 3.25 | 4 | 4 | 80 | 2 | no |
| 37 | 2.10 | 1-10 | $1 \times 10^{-3}$ | 36 | 1.15 | 3-4 | $8 \times 10^{-4}$ | 27 | 3.25 | 4 | 4 | 80 | 2 | no |
| 38 | 2.10 | 1-10 | $1 \times 10^{-3}$ | 36 | 1.15 | 3-4 | $1 \times 10^{-3}$ | 25 | 3.25 | 5 | 5 | 80 | 2 | no |
| 39 | 2.10 | 1-10 | $1 \times 10^{-3}$ | 36 | 1.15 | 3-4 | $3 \times 10^{-3}$ | 20 | 3.25 | 5 | 5 | 80 | 2 | no |
| 40 | 2.10 | 1-10 | $1 \times 10^{-3}$ | 36 | 1.15 | 3-4 | $7 \times 10^{-3}$ | 15 | 3.25 | 5 | 5 | 80 | 2 | no |
| 41 | 2.00 | 1-10 | $1 \times 10^{-3}$ | 36 | 1.15 | 2-81 | $4 \times 10^{-4}$ | 30 | 3.15 | 4 | 4 | 100 | 3 | no |
| 42 | 2.00 | 1-10 | $1 \times 10^{-3}$ | 36 | 1.15 | 2-81 | $2 \times 10^{-3}$ | 27 | 3.15 | 4 | 4 | 100 | 3 | no |
| 43 | 2.00 | 1-10 | $1 \times 10^{-3}$ | 36 | 1.15 | 2-81 | $4 \times 10^{-3}$ | 25 | 3.15 | 5 | 5 | 100 | 3 | yes |
| 44 | 2.00 | 1-10 | $1 \times 10^{-3}$ | 36 | 1.15 | 2-81 | $1.5 \times 10^{-2}$ | 20 | 3.15 | 5 | 5 | 100 | 3 | yes |
| 45 | 2.00 | 1-10 | $1 \times 10^{-3}$ | 36 | 1.15 | 2-81 | $4 \times 10^{-2}$ | 15 | 3.15 | 5 | 5 | 100 | 3 | yes |
| 46 | 1.70 | 1-10 | $1 \times 10^{-3}$ | 36 | 1.00 | 2-81 | $4 \times 10^{-4}$ | 30 | 2.70 | 3 | 3 | 110 | 4 | no |
| 47 | 1.70 | 1-10 | $1 \times 10^{-3}$ | 36 | 1.00 | 2-81 | $2 \times 10^{-3}$ | 27 | 2.70 | 4 | 4 | 110 | 4 | no |

TABLE 1-continued

| Sample No. | Silver halide emulsion layer: Amount of gelatin ($g/m^2$) (per face) | Surfactant: Type | Surfactant: Amount per face ($g/m^2$) | Surface tension (dyn/cm) | Protective layer: Amount of gelatin ($g/m^2$) (per face) | Surfactant: Type | Surfactant: Amount per face ($g/m^2$) | Surface tension (dyn/cm) | Total of gelatin ($g/m^2$) (per face) | Coating defects: Front face | Coating defects: Rear face | Sensitivity | Drying properties | (Note) Invention or not |
|---|---|---|---|---|---|---|---|---|---|---|---|---|---|---|
| 48 | 1.70 | 1-10 | $1 \times 10^{-3}$ | 36 | 1.00 | 2-81 | $4 \times 10^{-3}$ | 25 | 2.70 | 4 | 4 | 110 | 4 | yes |
| 49 | 1.70 | 1-10 | $1 \times 10^{-3}$ | 36 | 1.00 | 2-81 | $1.5 \times 10^{-2}$ | 20 | 2.70 | 5 | 5 | 110 | 4 | yes |
| 50 | 1.70 | 1-10 | $1 \times 10^{-3}$ | 36 | 1.00 | 2-81 | $4 \times 10^{-2}$ | 15 | 2.70 | 5 | 5 | 110 | 4 | yes |
| 51 | 1.25 | 1-10 | $1 \times 10^{-3}$ | 36 | 1.00 | 2-82 | $2 \times 10^{-4}$ | 30 | 2.25 | 2 | 2 | 120 | 5 | no |
| 52 | 1.25 | 1-10 | $1 \times 10^{-3}$ | 36 | 1.00 | 2-82 | $1 \times 10^{-3}$ | 27 | 2.25 | 2 | 2 | 120 | 5 | no |
| 53 | 1.25 | 1-10 | $1 \times 10^{-3}$ | 36 | 1.00 | 2-82 | $2 \times 10^{-3}$ | 25 | 2.25 | 3 | 3 | 120 | 5 | yes |
| 54 | 1.25 | 1-10 | $1 \times 10^{-3}$ | 36 | 1.00 | 2-82 | $7.5 \times 10^{-3}$ | 20 | 2.25 | 3 | 3 | 120 | 5 | yes |
| 55 | 1.25 | 1-10 | $1 \times 10^{-3}$ | 36 | 1.00 | 2-82 | $2 \times 10^{-2}$ | 15 | 2.25 | 4 | 4 | 120 | 5 | yes |
| 56 | 1.10 | 1-10 | $1 \times 10^{-3}$ | 37 | 1.00 | 2-82 | $2 \times 10^{-4}$ | 30 | 2.10 | 1 | 1 | 135 | 5 | no |
| 57 | 1.10 | 1-10 | $1 \times 10^{-3}$ | 37 | 1.00 | 2-82 | $1 \times 10^{-3}$ | 27 | 2.10 | 1 | 1 | 135 | 5 | no |
| 58 | 1.10 | 1-10 | $1 \times 10^{-3}$ | 37 | 1.00 | 2-82 | $2 \times 10^{-3}$ | 25 | 2.10 | 2 | 2 | 135 | 5 | no |
| 59 | 1.10 | 1-10 | $1 \times 10^{-3}$ | 37 | 1.00 | 2-82 | $7.5 \times 10^{-3}$ | 20 | 2.10 | 2 | 2 | 135 | 5 | no |
| 60 | 1.10 | 1-10 | $1 \times 10^{-3}$ | 37 | 1.00 | 2-82 | $2 \times 10^{-2}$ | 15 | 2.10 | 2 | 2 | 135 | 5 | no |

TABLE 2

| Sample No. | Total of gelatin (per face, g/m²) | Surface tension (Protective layer) (dyn/cm) | Sensitivity 45 sec process | Sensitivity 90 sec process |
|---|---|---|---|---|
| 33 | 3.45 | 25 | 70 | 100 |
| 38 | 3.25 | 25 | 80 | 110 |
| 43 | 3.15 | 25 | 100 | 130 |
| 48 | 2.70 | 25 | 110 | 140 |
| 53 | 2.25 | 25 | 120 | 150 |
| 58 | 2.10 | 25 | 135 | 165 |

The results in Tables 1-1, 1-2 and 2 demonstrate that one preferred example embodying the invention excels in coating properties (especially, the similar properties with the rear face), sensitivity and dying properties, and, therefore, that the super-rapid processing is feasible. As compared with the results of the conventional 90 seconds process, it is apparent that the invention provides the processing capacity twice that of a conventional system, with the processing time reduced to the half, while maintaining the sensitivity of the conventional system.

EXAMPLE 2

The emulsion E - 2 was prepared in the following manner. First, under the controlled conditions of 60° C., pAg =8.0 and pH=2.0, the monodisperse emulsion of spherical particles of silver iodo-bromide containing particles of 2.0 mol % of silver iodide of which average size being 0.3 μm was prepared. The electron microscopic photograph of this emulsion showed the occurrence of twin crystals in terms of number was less than 1%. The emulsion containing the crystals serving as seeds was added to a solution having a temperature constantly kept at 40° C. and comprising protective gelatin, as well as ammonia which was added according to a requirement, thereby homogenized, then the pH was adjusted with glacial acetic acid.

Figure 3:
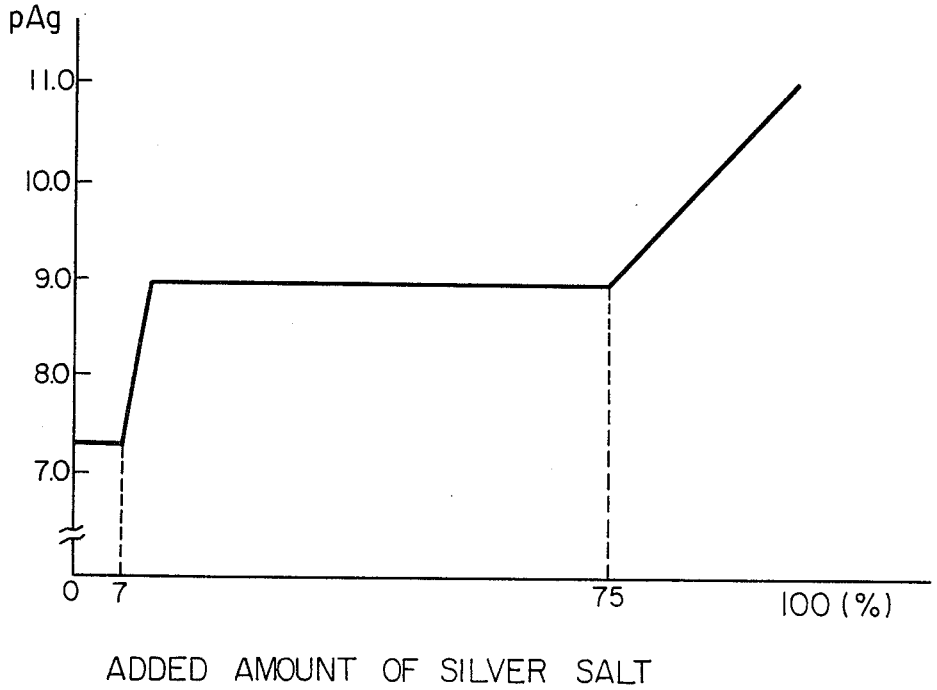
FIG. 3 is a graph illustrating a pattern of controlling pAg while preparing various types of silver halide particles respectively involving various percentages of silver iodide.

To the prepared solution serving as a parent solution, 3.2N aqueous ammoniac silver ion solution as well as aqueous halide solution were added, with the controlled flow rate, by means of the double jet precipitation method, in order to sequentially form a plurality of layers, each having a specific silver iodide content, onto individual core particles. During this course, and to form a layer containing 30 mol % of silver iodide, the pAg was adjusted to 7.3, and the pH to 9.7. A layer having 0 mol % of silver iodide was formed by controllingly keeping the level of pAg at 9.0 or more than 9.0, as shown in FIG. 3. More specifically, as FIG. 3 shows, up to 7% of the added amount of silver salt was formed with more than 20 mol % of silver iodide, then the layer containing less than 20 mol % of silver iodide was formed onto individual particles in compliance with the pattern shown in FIG. 3. The emulsion prepared was monodisperse silver iodo-bromide emulsion in which the average size of silver halide particles was 0.85 μm, and the ratio of silver iodide to the total amount of silver halide was 2 mol %.

The obtained emulsion E - 2 was subjected to the optimum sensitization with gold and sulfur in a manner identical to that of Example - 1, then stabilized with 4-hydroxy-6-methyl-1, 3,3a-7-tetrazaindene. Next, the following sensitizing dye (I) was added to the emulsion at a ratio of 200 mg per mol silver halide.

Sensitizing dye (I)

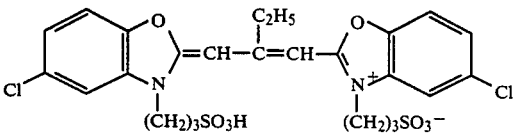

A protective layer containing a hardner and the emulsion layer were formed by coating in a manner identical to that of Example 1, to prepared the samples No. 61 through 120. With the samples Nos. 61 through 90, the front and rear faces were unsuccessively coated and dried; while both faces of the samples Nos. 91 through 120 were successively coated and simultaneously dried.

The samples obtained were evaluated in a manner identical to that of Example 1. Table 3-1 and 3-2 list the results.

As Tables 3-1 and 3-2 show, the system incorporating dye-sensitization indicates the effects of the invention.

TABLE 3

| Sample No. | Silver halide emulsion layer: Amount of gelatin ($g/m^2$) (per face) | Silver halide emulsion layer: Surfactant Type | Silver halide emulsion layer: Surfactant Amount per face ($g/m^2$) | Silver halide emulsion layer: Surface tension (dyn/cm) | Protective layer: Amount of gelatin ($g/m^2$) (per face) | Protective layer: Surfactant Type | Protective layer: Surfactant Amount per face ($g/m^2$) | Protective layer: Surface tension (dyn/cm) | Total of gelatin ($g/m^2$) (per face) | Coating defects: Front face | Coating defects: Rear face | Sensitivity | Drying properties | (Note) Invention or not |
|---|---|---|---|---|---|---|---|---|---|---|---|---|---|---|
| 61 | 2.30 | 1-10 | $1 \times 10^{-3}$ | 36 | 1.15 | 1-10 | $8 \times 10^{-4}$ | 30 | 3.45 | 5 | 5 | 90 | 1 | no |
| 62 | 2.30 | 1-10 | $1 \times 10^{-3}$ | 36 | 1.15 | 1-10 | $1.1 \times 10^{-3}$ | 27 | 3.45 | 5 | 4 | 90 | 1 | no |
| 63 | 2.30 | 1-10 | $1 \times 10^{-3}$ | 36 | 1.15 | 1-10 | $2 \times 10^{-3}$ | 25 | 3.45 | 5 | 4 | 90 | 1 | no |
| 64 | 2.30 | 1-10 | $1 \times 10^{-3}$ | 36 | 1.15 | 1-10 | $3.5 \times 10^{-3}$ | 20 | 3.45 | 5 | 3 | 90 | 1 | no |
| 65 | 2.30 | 1-10 | $1 \times 10^{-3}$ | 36 | 1.15 | 1-10 | $5 \times 10^{-3}$ | 15 | 3.45 | 5 | 3 | 90 | 1 | no |
| 66 | 2.10 | 1-10 | $1 \times 10^{-3}$ | 36 | 1.15 | 3-4 | $6 \times 10^{-4}$ | 30 | 3.25 | 4 | 4 | 100 | 2 | no |
| 67 | 2.10 | 1-10 | $1 \times 10^{-3}$ | 36 | 1.15 | 3-4 | $8 \times 10^{-4}$ | 27 | 3.25 | 4 | 4 | 100 | 2 | no |
| 68 | 2.10 | 1-10 | $1 \times 10^{-3}$ | 36 | 1.15 | 3-4 | $1 \times 10^{-3}$ | 25 | 3.25 | 5 | 3 | 100 | 2 | no |
| 69 | 2.10 | 1-10 | $1 \times 10^{-3}$ | 36 | 1.15 | 3-4 | $3 \times 10^{-3}$ | 20 | 3.25 | 5 | 3 | 100 | 2 | no |
| 70 | 2.10 | 1-10 | $1 \times 10^{-3}$ | 36 | 1.15 | 3-4 | $7 \times 10^{-3}$ | 15 | 3.25 | 5 | 2 | 100 | 2 | no |
| 71 | 2.00 | 1-10 | $1 \times 10^{-3}$ | 36 | 1.15 | 2-81 | $4 \times 10^{-4}$ | 30 | 3.15 | 4 | 4 | 120 | 3 | no |
| 72 | 2.00 | 1-10 | $1 \times 10^{-3}$ | 36 | 1.15 | 2-81 | $2 \times 10^{-3}$ | 27 | 3.15 | 4 | 3 | 120 | 3 | no |
| 73 | 2.00 | 1-10 | $1 \times 10^{-3}$ | 36 | 1.15 | 2-81 | $4 \times 10^{-3}$ | 25 | 3.15 | 5 | 3 | 120 | 3 | no |
| 74 | 2.00 | 1-10 | $1 \times 10^{-3}$ | 36 | 1.15 | 2-81 | $1.5 \times 10^{-2}$ | 20 | 3.15 | 5 | 2 | 120 | 3 | no |
| 75 | 2.00 | 1-10 | $1 \times 10^{-3}$ | 36 | 1.15 | 2-81 | $4 \times 10^{-2}$ | 15 | 3.15 | 5 | 2 | 120 | 3 | no |
| 76 | 1.70 | 1-10 | $1 \times 10^{-3}$ | 36 | 1.00 | 2-81 | $4 \times 10^{-4}$ | 30 | 2.70 | 3 | 3 | 130 | 4 | no |
| 77 | 1.70 | 1-10 | $1 \times 10^{-3}$ | 36 | 1.00 | 2-81 | $2 \times 10^{-3}$ | 27 | 2.70 | 4 | 3 | 130 | 4 | no |
| 78 | 1.70 | 1-10 | $1 \times 10^{-3}$ | 36 | 1.00 | 2-81 | $4 \times 10^{-3}$ | 25 | 2.70 | 4 | 2 | 130 | 4 | no |
| 79 | 1.70 | 1-10 | $1 \times 10^{-3}$ | 36 | 1.00 | 2-81 | $1.5 \times 10^{-2}$ | 20 | 2.70 | 5 | 2 | 130 | 4 | no |
| 80 | 1.70 | 1-10 | $1 \times 10^{-3}$ | 36 | 1.00 | 2-81 | $4 \times 10^{-2}$ | 15 | 2.70 | 5 | 1 | 130 | 4 | no |
| 81 | 1.25 | 1-10 | $1 \times 10^{-3}$ | 36 | 1.00 | 2-82 | $2 \times 10^{-4}$ | 30 | 2.25 | 2 | 2 | 140 | 5 | no |
| 82 | 1.25 | 1-10 | $1 \times 10^{-3}$ | 36 | 1.00 | 2-82 | $1 \times 10^{-3}$ | 27 | 2.25 | 2 | 2 | 140 | 5 | no |
| 83 | 1.25 | 1-10 | $1 \times 10^{-3}$ | 36 | 1.00 | 2-82 | $2 \times 10^{-3}$ | 25 | 2.25 | 3 | 1 | 140 | 5 | no |
| 84 | 1.25 | 1-10 | $1 \times 10^{-3}$ | 36 | 1.00 | 2-82 | $7.5 \times 10^{-3}$ | 20 | 2.25 | 5 | 1 | 140 | 5 | no |
| 85 | 1.25 | 1-10 | $1 \times 10^{-3}$ | 36 | 1.00 | 2-82 | $2 \times 10^{-2}$ | 15 | 2.25 | 5 | 1 | 140 | 5 | no |
| 86 | 1.10 | 1-10 | $1 \times 10^{-3}$ | 37 | 1.00 | 2-82 | $2 \times 10^{-4}$ | 30 | 2.10 | 1 | 1 | 155 | 5 | no |
| 87 | 1.10 | 1-10 | $1 \times 10^{-3}$ | 37 | 1.00 | 2-82 | $1 \times 10^{-3}$ | 27 | 2.10 | 1 | 1 | 155 | 5 | no |
| 88 | 1.10 | 1-10 | $1 \times 10^{-3}$ | 37 | 1.00 | 2-82 | $2 \times 10^{-3}$ | 25 | 2.10 | 3 | 1 | 155 | 5 | no |
| 89 | 1.10 | 1-10 | $1 \times 10^{-3}$ | 37 | 1.00 | 2-82 | $7.5 \times 10^{-3}$ | 20 | 2.10 | 4 | 1 | 155 | 5 | no |
| 90 | 1.10 | 1-10 | $1 \times 10^{-3}$ | 37 | 1.00 | 2-82 | $2 \times 10^{-2}$ | 15 | 2.10 | 5 | 1 | 155 | 5 | no |
| 91 | 2.30 | 1-10 | $1 \times 10^{-3}$ | 36 | 1.15 | 1-10 | $8 \times 10^{-4}$ | 30 | 3.45 | 5 | 5 | 90 | 1 | no |
| 92 | 2.30 | 1-10 | $1 \times 10^{-3}$ | 36 | 1.15 | 1-10 | $1.1 \times 10^{-3}$ | 27 | 3.45 | 5 | 5 | 90 | 1 | no |
| 93 | 2.30 | 1-10 | $1 \times 10^{-3}$ | 36 | 1.15 | 1-10 | $2 \times 10^{-3}$ | 25 | 3.45 | 5 | 5 | 90 | 1 | no |
| 94 | 2.30 | 1-10 | $1 \times 10^{-3}$ | 36 | 1.15 | 1-10 | $3.5 \times 10^{-3}$ | 20 | 3.45 | 5 | 5 | 90 | 1 | no |
| 95 | 2.30 | 1-10 | $1 \times 10^{-3}$ | 36 | 1.15 | 1-10 | $5 \times 10^{-3}$ | 15 | 3.45 | 5 | 5 | 90 | 1 | no |
| 96 | 2.10 | 1-10 | $1 \times 10^{-3}$ | 36 | 1.15 | 3-4 | $6 \times 10^{-4}$ | 30 | 3.25 | 4 | 4 | 100 | 2 | no |
| 97 | 2.10 | 1-10 | $1 \times 10^{-3}$ | 36 | 1.15 | 3-4 | $8 \times 10^{-4}$ | 27 | 3.25 | 4 | 4 | 100 | 2 | no |
| 98 | 2.10 | 1-10 | $1 \times 10^{-3}$ | 36 | 1.15 | 3-4 | $1 \times 10^{-3}$ | 25 | 3.25 | 5 | 5 | 100 | 2 | no |
| 99 | 2.10 | 1-10 | $1 \times 10^{-3}$ | 36 | 1.15 | 3-4 | $3 \times 10^{-3}$ | 20 | 3.25 | 5 | 5 | 100 | 2 | no |
| 100 | 2.10 | 1-10 | $1 \times 10^{-3}$ | 36 | 1.15 | 3-4 | $7 \times 10^{-3}$ | 15 | 3.25 | 5 | 5 | 100 | 2 | no |
| 101 | 2.00 | 1-10 | $1 \times 10^{-3}$ | 36 | 1.15 | 2-81 | $4 \times 10^{-4}$ | 30 | 3.15 | 4 | 4 | 120 | 3 | no |
| 102 | 2.00 | 1-10 | $1 \times 10^{-3}$ | 36 | 1.15 | 2-81 | $2 \times 10^{-3}$ | 27 | 3.15 | 4 | 4 | 120 | 3 | no |
| 103 | 2.00 | 1-10 | $1 \times 10^{-3}$ | 36 | 1.15 | 2-81 | $4 \times 10^{-3}$ | 25 | 3.15 | 5 | 5 | 120 | 3 | yes |
| 104 | 2.00 | 1-10 | $1 \times 10^{-3}$ | 36 | 1.15 | 2-81 | $1.5 \times 10^{-2}$ | 20 | 3.15 | 5 | 5 | 120 | 3 | yes |
| 105 | 2.00 | 1-10 | $1 \times 10^{-3}$ | 36 | 1.15 | 2-81 | $4 \times 10^{-2}$ | 15 | 3.15 | 5 | 5 | 120 | 3 | yes |
| 106 | 1.70 | 1-10 | $1 \times 10^{-3}$ | 36 | 1.00 | 2-81 | $4 \times 10^{-4}$ | 30 | 2.70 | 3 | 3 | 130 | 4 | no |
| 107 | 1.70 | 1-10 | $1 \times 10^{-3}$ | 36 | 1.00 | 2-81 | $2 \times 10^{-3}$ | 27 | 2.70 | 4 | 4 | 130 | 4 | no |

TABLE 3-continued

| Sample No. | Silver halide emulsion layer: Amount of gelatin ($g/m^2$) (per face) | Surfactant: Type | Surfactant: Amount per face ($g/m^2$) | Surface tension (dyn/cm) | Protective layer: Amount of gelatin ($g/m^2$) (per face) | Surfactant: Type | Surfactant: Amount per face ($g/m^2$) | Surface tension (dyn/cm) | Total of gelatin ($g/m^2$) (per face) | Coating defects: Front face | Coating defects: Rear face | Sensitivity | Drying properties | (Note) Invention or not |
|---|---|---|---|---|---|---|---|---|---|---|---|---|---|---|
| 108 | 1.70 | 1-10 | $1 \times 10^{-3}$ | 36 | 1.00 | 2-81 | $4 \times 10^{-3}$ | 25 | 2.70 | 4 | 4 | 130 | 4 | yes |
| 109 | 1.70 | 1-10 | $1 \times 10^{-3}$ | 36 | 1.00 | 2-81 | $1.5 \times 10^{-2}$ | 20 | 2.70 | 5 | 5 | 130 | 4 | yes |
| 110 | 1.70 | 1-10 | $1 \times 10^{-3}$ | 36 | 1.00 | 2-81 | $4 \times 10^{-2}$ | 15 | 2.70 | 5 | 5 | 130 | 4 | yes |
| 111 | 1.25 | 1-10 | $1 \times 10^{-3}$ | 36 | 1.00 | 2-82 | $2 \times 10^{-4}$ | 30 | 2.25 | 2 | 2 | 140 | 5 | no |
| 112 | 1.25 | 1-10 | $1 \times 10^{-3}$ | 36 | 1.00 | 2-82 | $1 \times 10^{-3}$ | 27 | 2.25 | 2 | 2 | 140 | 5 | no |
| 113 | 1.25 | 1-10 | $1 \times 10^{-3}$ | 36 | 1.00 | 2-82 | $2 \times 10^{-3}$ | 25 | 2.25 | 3 | 3 | 140 | 5 | yes |
| 114 | 1.25 | 1-10 | $1 \times 10^{-3}$ | 36 | 1.00 | 2-82 | $7.5 \times 10^{-3}$ | 20 | 2.25 | 3 | 3 | 140 | 5 | yes |
| 115 | 1.25 | 1-10 | $1 \times 10^{-3}$ | 36 | 1.00 | 2-82 | $2 \times 10^{-2}$ | 15 | 2.25 | 4 | 4 | 140 | 5 | yes |
| 116 | 1.10 | 1-10 | $1 \times 10^{-3}$ | 37 | 1.00 | 2-82 | $2 \times 10^{-4}$ | 30 | 2.10 | 1 | 1 | 155 | 5 | no |
| 117 | 1.10 | 1-10 | $1 \times 10^{-3}$ | 37 | 1.00 | 2-82 | $1 \times 10^{-3}$ | 27 | 2.10 | 1 | 1 | 155 | 5 | no |
| 118 | 1.10 | 1-10 | $1 \times 10^{-3}$ | 37 | 1.00 | 2-82 | $2 \times 10^{-3}$ | 25 | 2.10 | 2 | 2 | 155 | 5 | no |
| 119 | 1.10 | 1-10 | $1 \times 10^{-3}$ | 37 | 1.00 | 2-82 | $7.5 \times 10^{-3}$ | 20 | 2.10 | 2 | 2 | 155 | 5 | no |
| 120 | 1.10 | 1-10 | $1 \times 10^{-3}$ | 37 | 1.00 | 2-82 | $2 \times 10^{-2}$ | 15 | 2.10 | 2 | 2 | 155 | 5 | no |

EXAMPLE 3

TABLE 4

| Sample No. | Names of emulsion | Silver halide emulsion layer: Amount of gelatin ($g/m^2$) (per face) | Surfactant: Type | Surfactant: Amount per face ($g/m^2$) | Surface tension (dyn/cm) | Protective layer: Amount of gelatin ($g/m^2$) (per face) | Surfactant: Type | Surfactant: Amount per face ($g/m^2$) | Surface tension (dyn/cm) | Total of gelatin ($g/m^2$) (per face) | Sensitivity | Scratch induced fogging (g) |
|---|---|---|---|---|---|---|---|---|---|---|---|---|
| 121 | E-3 | 2.30 | 1-10 | $1.5 \times 10^{-3}$ | 36 | 1.15 | 1-10 | $8 \times 10^{-4}$ | 30 | 3.45 | 100 | 55 |
| 122 | E-4 | 2.30 | 1-10 | $1.5 \times 10^{-3}$ | 36 | 1.15 | 1-10 | $8 \times 10^{-4}$ | 30 | 3.45 | 100 | 57 |
| 123 | E-5 | 2.30 | 1-10 | $1.5 \times 10^{-3}$ | 36 | 1.15 | 1-10 | $8 \times 10^{-4}$ | 30 | 3.45 | 105 | 60 |
| 124 | E-6 | 2.30 | 1-10 | $1.5 \times 10^{-3}$ | 36 | 1.15 | 1-10 | $8 \times 10^{-4}$ | 30 | 3.45 | 120 | 65 |
| 125 | E-7 | 2.30 | 1-10 | $1.5 \times 10^{-3}$ | 36 | 1.15 | 1-10 | $8 \times 10^{-4}$ | 30 | 3.45 | 125 | 65 |
| 126 | E-3 | 1.70 | 1-10 | $1.5 \times 10^{-3}$ | 36 | 1.00 | 2-82 | $2 \times 10^{-3}$ | 25 | 2.70 | 125 | 35 |
| 127 | E-4 | 1.70 | 1-10 | $1.5 \times 10^{-3}$ | 36 | 1.00 | 2-82 | $2 \times 10^{-3}$ | 25 | 2.70 | 130 | 39 |
| 128 | E-5 | 1.70 | 1-10 | $1.5 \times 10^{-3}$ | 36 | 1.00 | 2-82 | $2 \times 10^{-3}$ | 25 | 2.70 | 140 | 50 |
| 129 | E-6 | 1.70 | 1-10 | $1.5 \times 10^{-3}$ | 36 | 1.00 | 2-82 | $2 \times 10^{-3}$ | 25 | 2.70 | 150 | 57 |
| 130 | E-7 | 1.70 | 1-10 | $1.5 \times 10^{-3}$ | 36 | 1.00 | 2-82 | $2 \times 10^{-3}$ | 25 | 2.70 | 160 | 60 |

The preparation of emulsions E - 3 through E - 7 respectively having multi-layered silver halide particles is hereinunder described. First, a solution containing 3.0N aqueous ammoniac silver ion solution, as well as a solution containing 2.0 mol % of potassium bromide and potassium iodide were added to gelatin solution, by means of the double jet precipitation method, under the conditions of 45° C., pAg =11.0 and pH =9.0. As the particles grew, the rate of addition was increased.

The emulsion obtained was a monodisperse emulsion containing octahedral particles with an average size of 1.05 μm. Next, to the emulsion were added silver ionic aqueous ammonia solution and potassium bromide solution, by means of the double jet precipitation method, under the conditions of pAg=11.0 and pH =9.0, so as to form the pure silver bromide shell onto each particle. The emulsion obtained was a monodisperse emulsion containing octahedral particles with an average size of 1.10 μm. The emulsion was designated E - 3.

With a method somewhat similar to that of E - 3, octahedral silver iodo-bromide emulsions containing silver iodide respectively at the rate of 5 mol %, 10 mol %, 20 mol % and 30 mol % were prepared by varying the ratio between potassium iodide and potassium bromide, by varying the core diameters in order to make constant the average content of silver iodide after the shell was formed onto individual cores, and by controlling the addition rate in the early phase of mixing in order to make identical the sizes of resultant particles. With steps following the above step and identical to those of E - 3, the emulsions each being a monodisperse emulsion having octahedral particles of an average size 1.10 μm. These emulsions were designated E - 4, E - 5, E - 6 and E - 7.

The obtained five types of emulsions were chemically sensitized in a manner identical to that of Example - 1, then stabilized, applied successively onto both sides, thus the samples No. 121 through 130 listed in Table 4 were obtained.

These samples were subjected to the 45 seconds process identical to that of Example 1, to determine sensitivities. Additionally, the scratch-induced fogging was evaluated in the following manner. More specifically, each sample was subjected to moisture control with a temperature of 23° C. and humidity of 55% RH for four hours, then scratched using a 0.3 mm radius sapphire stylus with a continuously varied load, and developed, thereby a minimum load (in gram) being capable of inducing the fogging was determined. The smaller the value of load is, the more the sample is prone to the scratch-induced fogging.

Table 4 lists the results. As can be understood from Table 4, when compared to particles in which the difference in iodide contents between the core and shell is less than 10 mol %, the particles in which the similar difference is more than 10 mol % are more resistant to the scratch-induced fogging with a smaller amount of gelatin, and provide excellent sensitivity.

EXZAMPLE 4

Under the controlled conditions of 60° C., pAg=8.0 and pH =2.0, the monodisperse emulsion of cubic particles of silver iodo-bromide containing particles of 2.0 mol % of silver iodobromide of which average size being 0.28 μm was prepared by the double jet precipitation method. Using the particles in this emulsion as seed particles, crystals were grown in the following manner. Under the conditions of 40° C., pAg=8.0 and pH=9.5, to the solution containing both the seeds and gelatin were added ammonia silver nitrate solution, as well as a solution containing potassium iodide and potassium bromide by means of the double jet precipitation method. Thus, the first coating layer was formed onto individual particles; this layer contained silver iodide at a ratio of 5 mol %, 10 mol %, 15 mol % or 20 mol %.

With each of the resultant emulsions, the second coating layer was formed onto individual particles, in a manner identical to that of E - 3, except that the pAg was 9.0. Thus, the monodisperse core/shell emulsions containing cubic silver iodo-bromide particles with an average size of 0.80 μm were prepared. These emulsions were designated E - 8, E - 9, E - 10 and E - 11. The average silver iodide content of each emulsion was 3 mol %.

These emulsion were chemically sensitized in a manner identical to that of Example 1, then to the emulsions was added the sensitizing dye (I) which was used in Example 2, or the following sensitizing dye (II), or the following sensitizing dye (III) serving as a comparison dye, thereby each emulsion was simultaneously applied to both faces of a support in a manner identical to that of Example 1. Thus, the samples Nos. 131 through 146 were prepared.

With the obtained samples, the scratch-induced fogging and sensitivity were evaluated in a manner identical to that of Example 3. The results are listed in Table 5.

Sensitizing dye (II)

-continued

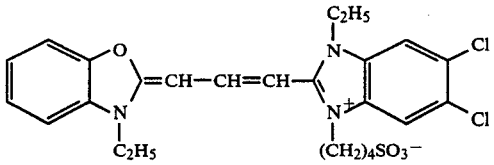

Sensitizing dye (III) (Comparison)

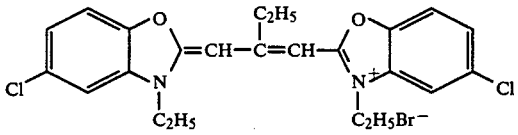

tation method. Thus, the monodisperse emulsion containing cubic silver iodo-bromide particles with an average size of 0.57 μm was prepared, and designated E - 12. The average silver iodide content was 2.5 mol %.

The sensitizing dye (I) whose structure is described later was added to the emulsion E - 12 at a rate of 520 mg/molAg. To the emulsion was further added gold thiocyanate and sodium thiosulfate for the optimum gold/sulfur sensitization, then 4-hydroxy-6-methyl-1,3,3a,7-tetrazaindene was added for stabilization, thereby the gelatin content was adjusted as listed in Table 6. Thus, the coating solutions for emulsion layer were prepared. Next, a monodisperse matting agent with an average particle size of 4 μm was used to attain mattness specified in Table 6 (for this purpose, polymethyl methacrylate PMMA was used), thereby the

TABLE 5

| | | Silver halide emulsion layer | | | | | | | Protective layer | | | | | | |
|---|---|---|---|---|---|---|---|---|---|---|---|---|---|---|---|
| Sample No. | Name of emulsion | Sensitizing dye Type | Amount of dye (mg/mol AgX) | Amount of gelatin ($g/m^2$) (per face) | Surfactant Type | Surfactant Amount per face ($g/m^2$) | Surface tension (dyn/cm) | Amount of gelatin ($g/m^2$) (per face) | Surfactant Type | Surfactant Amount per face ($g/m^2$) | Surface tension (dyn/cm) | Total of gelatin ($g/m^2$) (per face) | Sensitivity | Scratch induced fogging (g) |
| 131 | E-8 | ① | 200 | 2.30 | 1-10 | $1.5\times10^{-3}$ | 36 | 1.15 | 1-10 | $8\times10^{-4}$ | 30 | 3.45 | 120 | 50 |
| 132 | E-9 | ① | 200 | 2.30 | 1-10 | $1.5\times10^{-3}$ | 36 | 1.15 | 1-10 | $8\times10^{-4}$ | 30 | 3.45 | 120 | 53 |
| 133 | E-10 | ① | 200 | 2.30 | 1-10 | $1.5\times10^{-3}$ | 36 | 1.15 | 1-10 | $8\times10^{-4}$ | 30 | 3.45 | 125 | 55 |
| 134 | E-11 | ① | 200 | 2.30 | 1-10 | $1.5\times10^{-3}$ | 36 | 1.15 | 1-10 | $8\times10^{-4}$ | 30 | 3.45 | 135 | 60 |
| 135 | E-8 | ① | 200 | 1.70 | 1-10 | $1.5\times10^{-3}$ | 36 | 1.10 | 2-81 | $4\times10^{-3}$ | 25 | 2.70 | 150 | 30 |
| 136 | E-9 | ① | 200 | 1.70 | 1-10 | $1.5\times10^{-3}$ | 36 | 1.10 | 2-81 | $4\times10^{-3}$ | 25 | 2.70 | 150 | 35 |
| 137 | E-10 | ① | 200 | 1.70 | 1-10 | $1.5\times10^{-3}$ | 36 | 1.10 | 2-81 | $4\times10^{-3}$ | 25 | 2.70 | 160 | 50 |
| 138 | E-11 | ① | 200 | 1.70 | 1-10 | $1.5\times10^{-3}$ | 36 | 1.10 | 2-81 | $4\times10^{-3}$ | 25 | 2.70 | 170 | 57 |
| 139 | E-8 | ② | 200 | 1.70 | 1-10 | $1.5\times10^{-3}$ | 36 | 1.10 | 2-81 | $4\times10^{-3}$ | 25 | 2.70 | 140 | 30 |
| 140 | E-9 | ② | 200 | 1.70 | 1-10 | $1.5\times10^{-3}$ | 36 | 1.10 | 2-81 | $4\times10^{-3}$ | 25 | 2.70 | 140 | 35 |
| 141 | E-10 | ② | 200 | 1.70 | 1-10 | $1.5\times10^{-3}$ | 36 | 1.10 | 2-81 | $4\times10^{-3}$ | 25 | 2.70 | 150 | 50 |
| 142 | E-11 | ② | 200 | 1.70 | 1-10 | $1.5\times10^{-3}$ | 36 | 1.10 | 2-81 | $4\times10^{-3}$ | 25 | 2.70 | 155 | 57 |
| 143 | E-8 | ③ | 200 | 1.70 | 1-10 | $1.5\times10^{-3}$ | 36 | 1.10 | 2-81 | $4\times10^{-3}$ | 25 | 2.70 | 120 | 30 |
| 144 | E-9 | ③ | 200 | 1.70 | 1-10 | $1.5\times10^{-3}$ | 36 | 1.10 | 2-81 | $4\times10^{-3}$ | 25 | 2.70 | 120 | 35 |
| 145 | E-10 | ③ | 200 | 1.70 | 1-10 | $1.5\times10^{-3}$ | 36 | 1.10 | 2-81 | $4\times10^{-3}$ | 25 | 2.70 | 125 | 50 |
| 146 | E-11 | ③ | 200 | 1.70 | 1-10 | $1.5\times10^{-3}$ | 36 | 1.10 | 2-81 | $4\times10^{-3}$ | 25 | 2.70 | 135 | 57 |

As can be understood from Table 5, when compared to a sample using a sensitizing dye, a sample using the particles in which layers the difference in iodide contents between the core and shell is more than 10 mol %, is more resistant, especially when the amount of gelatin is smaller, to the scratchinduced fogging and provides excellent sensitivity, even if the sample is a system having a sensitizing dye.

EXAMPLE 5

Under the controlled conditions of 60° C., pAg=8.0 and pH =2.0, the monodisperse emulsion of cubic particles of silver iodo-bromide containing particles of 2.0 mol % of silver iodobromide with an average size of 0.20 μm was prepared by the double jet precipitation method. Using a portion of the emulsion, core particles were grown up in the following manner. Under the conditions of 40° C., pAg=9.0 and pH=9.0, to the solution containing both the seeds and gelatin were added ammoniac silver nitrate solution, as well as a solution containing potassium iodide and potassium bromide, by means of the double jet precipitation method. Thus, the first coating layer was formed onto individual particles; this layer contained 30 mol % of silver iodide.

Additionally, under the conditions of pH=9.0 and pAg=9.0, the second coating layer of pure silver bromide was formed onto individual particles in the emulsion, by adding ammoniac silver nitrate solution and potassium bromide solution with the double jet precipigelatin content was adjusted as specified in Table 6, then a compound described later and serving as a hardener was added. Thus, the coating solution for a protective layer was prepared. These two types of coating solutions were applied in one step onto both faces of a polyester support having a subbing layer, by means of the slide hopper method, at the coating rate of 55 m/min.: the dual layer consisted of an emulsion layer (viscosity, 15 cp; surface tension, 34 dyn/cm; coating thickness, 47 μm), directly upon the support, as well as the protective layer (viscosity, 10 cp; surface tension, 25 dyn/cm; coating thickness 18 μm) which being the outer layer. Thus, the samples No. 151 through 181 were prepared. The added amount of silver salt incorporated into each sample was, in both faces, 4.5 $g/m^2$.

Each of obtained samples was evaluated for the relative sensitivity and drying characteristics, in a manner identical to that of Example 1.

The developer used was XD-90, and the fixer used was XF, both manufactured by Konishiroku Photo. Industry Co. LTD.

With each sample, and using the resultant characteristic curve, the exposure corresponding to (base density +fog density +1.0) was determined, and the relative sensitivity was also determined.

Additionally, with each sample, the drying properties were evaluated in the following manner. After being subjected to the above 45 seconds automatic developing, and drying a sample was examined for handling touch, degree of sticking with another sample, and other items, thereby the performance was expressed using five grades, that is, 1 (poor) through 5 (excellent). The grades 3 through 5 satisfy the criteria for practical use, while the grades 1 and 2 fail to satisfy the similar criteria. Additionally, to determine the sensitivity with the conventional 90 seconds treatment, some of the samples were subjected to the process with the above-mentioned 45 seconds automatic developing machine whose line speed being reduced to ½ of the original With each sample, the scratch-induced fogging was evaluated in the following manner. Two sheets of films each having been subjected to moisture control with a temperature of 23° C. and humidity of 55% RH for five hours were placed in one position, applied thereon, a 1 kg load. Next, the upper sheet together with the load was carefully slid on the bottom sheet, whereby the bottom sheet was developed without subjecting to the exposure, to evaluate the degree of scratchs with human vision. The results were expressed with five criteria, that is, 1 (poor) through 5 (excellent). The grades 3 through 5 satisfy the criteria for practical use, while the grades 1 and 2 fail to satisfy the similar criteria.

The sticking behavior of each sample was evaluated in the following manner. Three sheets of a specific sample, respectively cut into 15 cm by 15 cm size, were first controllingly moistened under the conditions of 23° C. and 55% RH for siz hours. After being sandwiched with sheets of paper or cardboard and vacuum-sealed under specified conditions, each set of sample sheets was allowed to stand for three days at a temperature of 55° C. Then, with each sample sheet, the degree of sticking was evaluated using the intensity, area and the like of sticking as criteria, and the performance was represented by the five grades, that is, 1 (poor) through 5 (excellent). The grades 3 through 5 satisfy the criteria for practical use, while the grades 1 and 2 fail to satisfy the similar criteria.

Additionally, with each sample, the matt pressure fogging was evaluated in the following manner. The sample developed without being subjected to exposure was evaluated with human vision, thereby the degree, intensity and number of fogs occurring around matting particles were represented by five grades, that is, 1 (poor) through 5 (excellent). The grades 3 through 5 satisfy the criteria for practical use, while the grades 1 and 2 fail to satisfy the similar criteria.

The results are listed in Table 6.

Sensitizing dye (I)

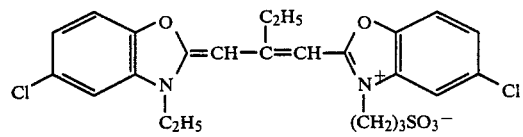

Hardener (1) HCHO

Mixture of (1) and (2)

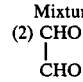

TABLE 6

| Sample No. | Amount of gelatin (per face, g/m²) Emulsion layer | Protective layer | Total | Mattness (mmHg) | Sensitivity 45 sec process | 90 sec process | Drying property | Scratch-induced fogging | Sticking | Matt pressure fogging |
|---|---|---|---|---|---|---|---|---|---|---|
| 151 | 2.65 | 1.15 | 3.80 | 170 | 60 | 100 | 1 | 4 | 5 | 4 |
| 152 | 2.65 | 1.15 | 3.80 | 90 | 60 | 100 | 1 | 4 | 4 | 5 |
| 153 | 2.65 | 1.15 | 3.80 | 25 | 60 | 100 | 1 | 5 | 2 | 5 |
| 154 | 2.30 | 1.15 | 3.45 | 170 | 80 | 115 | 2 | 3 | 5 | 4 |
| 155 | 2.30 | 1.15 | 3.45 | 90 | 80 | 115 | 2 | 4 | 4 | 4 |
| 156 | 2.30 | 1.15 | 3.45 | 25 | 80 | 115 | 2 | 5 | 2 | 5 |
| 157 | 2.05 | 1.15 | 3.20 | 169 | 100 | 130 | 3 | 2 | 5 | 3 |
| 158 | 2.05 | 1.15 | 3.20 | 120 | 100 | 130 | 3 | 3 | 4 | 4 |
| 159 | 2.05 | 1.15 | 3.20 | 80 | 100 | 130 | 3 | 3 | 4 | 4 |
| 160 | 2.05 | 1.15 | 3.20 | 50 | 100 | 130 | 3 | 3 | 3 | 5 |
| 161 | 2.05 | 1.15 | 3.20 | 24 | 100 | 130 | 3 | 4 | 2 | 5 |
| 162 | 1.95 | 1.00 | 2.95 | 167 | 125 | 140 | 3 | 2 | 4 | 2 |
| 163 | 1.95 | 1.00 | 2.95 | 115 | 125 | 140 | 3 | 3 | 4 | 3 |
| 164 | 1.95 | 1.00 | 2.95 | 80 | 125 | 140 | 3 | 3 | 3 | 3 |
| 165 | 1.95 | 1.00 | 2.95 | 49 | 125 | 140 | 3 | 3 | 3 | 4 |
| 166 | 1.95 | 1.00 | 2.95 | 26 | 125 | 140 | 3 | 4 | 2 | 4 |
| 167 | 1.70 | 1.00 | 2.70 | 169 | 140 | 150 | 4 | 2 | 4 | 2 |
| 168 | 1.70 | 1.00 | 2.70 | 115 | 140 | 150 | 4 | 3 | 4 | 3 |
| 169 | 1.70 | 1.00 | 2.70 | 80 | 140 | 150 | 4 | 3 | 3 | 3 |
| 170 | 1.70 | 1.00 | 2.70 | 51 | 140 | 150 | 4 | 3 | 3 | 3 |
| 171 | 1.70 | 1.00 | 2.70 | 25 | 140 | 150 | 4 | 4 | 2 | 4 |
| 172 | 1.35 | 1.00 | 2.35 | 160 | 145 | 155 | 4 | 1 | 4 | 2 |
| 173 | 1.35 | 1.00 | 2.35 | 110 | 145 | 155 | 4 | 3 | 3 | 3 |
| 174 | 1.35 | 1.00 | 2.35 | 75 | 145 | 155 | 4 | 3 | 3 | 3 |
| 175 | 1.35 | 1.00 | 2.35 | 30 | 145 | 155 | 4 | 4 | 1 | 3 |
| 176 | 1.15 | 1.00 | 2.15 | 160 | 145 | 160 | 5 | 1 | 4 | 1 |
| 177 | 1.15 | 1.00 | 2.15 | 50 | 145 | 160 | 5 | 3 | 3 | 3 |
| 178 | 1.15 | 1.00 | 2.15 | 25 | 145 | 160 | 5 | 4 | 1 | 3 |
| 179 | 0.95 | 1.00 | 1.95 | 160 | 150 | 160 | 5 | 1 | 3 | 1 |
| 180 | 0.95 | 1.00 | 1.95 | 50 | 150 | 160 | 5 | 1 | 2 | 2 |
| 181 | 0.95 | 1.00 | 1.95 | 25 | 150 | 160 | 5 | 2 | 1 | 2 |

As Table 6 demonstrates, a sample of the invention is highly sensitive (100 to 160), and excels in terms of the drying property, scratch-induced fogging, sticking, mattpressure fogging and the like (grades range from 3 to 5), and, apparently, suitable for the super-rapid processing. Furthermore, it is apparent that, when compared to the samples treated with the conventional 90 seconds process, a sample according to the invention permits a processing time, which is the half of the conventional processing time, and enables the processing capacity twice as large, though having sensitivity comparable to or better than a conventional system or sample.

What is claimed is:

1. A silver halide photographic light-sensitive material, comprising:

a support having a first side and a second side;

a first photographic structural layer comprising at least one layer on said first side of said support; and a second photographic structural layer comprising at least one layer on said second side of said support, wherein at least one of said photographic structural layers comprises a silver halide light-sensitive emulsion layer containing gelatin in an amount ranging from 2.25 g/m$^2$ to 3.15 g/m$^2$, wherein an uppermost layer of said at least one of said photographic structural layers containing said emulsion layer is formed by a coating from a solution having a surface tension ranging from 15 to 26 dyne/cm, and wherein said second photographic structural layer is coated and gelled simultaneously with a coating and drying step of said first photographic structural layer.

2. The silver halide photographic light-sensitive material of claim 1, wherein the surface of said photographic structural layer comprising said silver halide emulsion layer has a mattness within the rane of from 40 to 150 mmHg.

3. The silver halide photographic light-sensitive material of claim 1, wherein said silver halide emulsion layer contains a sensitizing dye selected from the compounds represented by formulas I, II and III;

I.

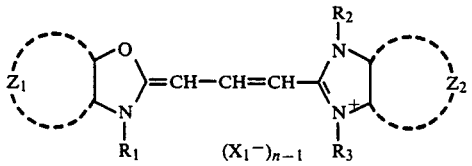

wherein $R_1$, $R_2$ and $R_3$ each represent an alkyl group, an alkenyl group or an aryl group, each of which may have a substituent and wherein at least one of $R_1$ and $R_3$ is a sulfoalkyl group or a carboalkyl group; $X_1^-$ represents an anion; $Z_1$ and $Z_2$ each represent a group of non-metallic atoms necessary to complete a substituted or unsubstituted carbon ring; and n is an integer of 1 or 2 provided that n is 1 when an intramolecular salt is formed;

II.

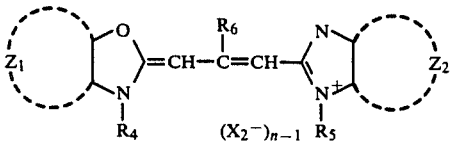

wherein $R_4$ and $R_5$ each represent an alkyl group, an alkenyl group or an aryl group each of which may have a substituent and wherein at least one of $R_4$ and $R_5$ is a sulfoalkyl group or a carboalkyl group; $R_6$ represents a hydrogen atom, a lower alkyl group or an aryl group; $X_2^-$ represents an anion; $Z_1$ and $Z_2$ each represent a group of non-metallic atoms necessary to complete a substituted or unsubstituted carbon ring; and n is an integer of 1 or 2 provided that n is 1 when an intramolecular shift is formed;

III.

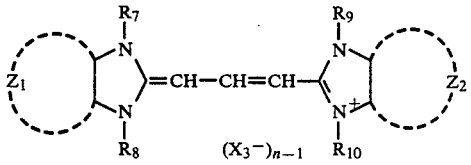

wherein $R_7$ and $R_8$ each represent a lower alkyl group each of which may have a substituent; $R_9$ and $R_{10}$ each represent a lower alkyl group, a hydroxyalkyl group, a sulfoalkyl group or a carboxyalkyl group; $X_3^-$ represents an anion; $Z_1$ and $Z_2$ each represent a group of non-metallic atoms necessary to complete a substituted or unsubstituted carbon ring; and n is an integer of 1 or 2 provided that n is 1 when an intramolecular salt is formed.

4. The silver halide photographic light-sensitive material of claim 2, wherein said photographic structural layer contains from 10 mg/m$^2$ to 500 mg/m$^2$ of a matting agent.

5. The silver halide photographic light-sensitive material of claim 2, wherein said silver halide emulsion layer contains a sensitizing dye selected from the compounds represented by formulas I, II and III:

I.

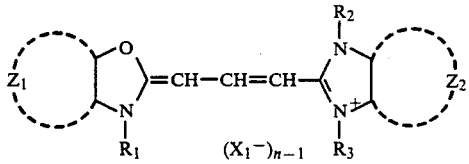

wherein $R_1$, $R_2$ and $R_3$ each represent an alkyl group, an alkenyl group or an aryl group, each of which may have a substituent and wherein at least one of $R_1$ and $R_3$ is a sulfoalkyl group or a carboalkyl group; $X_1^-$ represents an anion; $Z_1$ and $Z_2$ each represent a group of non-metallic atoms necessary to complete a substituted or unsubstituted carbon ring; and n is an integer of 1 or 2 provided than n is 1 when an intromolecular salt is formed;

II.

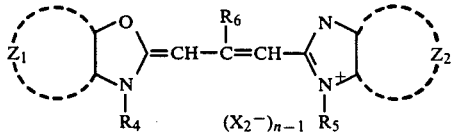

wherein $R_4$ and $R_5$ each represent an alkyl group, an alkenyl group or an aryl group each of which may have a substituent and wherein at least one of $R_4$ and $R_5$ is a sulfoalkyl group of a carboalkyl group; $R_6$ represents a hydrogen atom, a lower alkyl group or an aryl group; $X_2^-$ represents an anion; $Z_1$ and $Z_2$ each represent a group of non-metallic atoms necessary to complete a substituted or unsubstituted carbon ring; and n is an integer of 1 or 2 provided than n is 1 when an intramolecular salt is formed;

III.

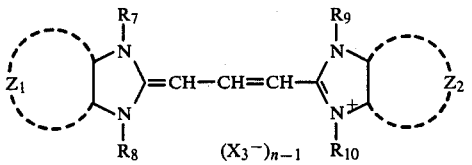

wherein $R_7$ and $R_8$ each represent a lower alkyl group each of which may have a substituent; $R_9$ and $R_{10}$ each represent a lower alkyl group, a hydroxyalkyl group, a sulfoalkyl group or a carboxyalkyl group; $X_3^-$ represents an anion; $Z_1$ and $Z_2$ each represent a group of non-metallic atoms necessary to complete a substituted or unsubstituted carbon ring; and n is an integer of 1 or 2 provided that n is 1 when an intramolecular salt is formed.

6. The silver halide photographic light sensitive material of claim 1, wherein said light-sensitive material is processed by an automatic processor requiring a total processing time of from 20 sec. to 60 sec.

* * * * *